(12) United States Patent
Nguyen et al.

(10) Patent No.: US 11,609,345 B2
(45) Date of Patent: Mar. 21, 2023

(54) SYSTEM AND METHOD TO DETERMINE POSITIONING IN A VIRTUAL COORDINATE SYSTEM

(71) Applicant: Rockwell Automation Technologies, Inc., Mayfield Heights, OH (US)

(72) Inventors: Thong T. Nguyen, New Berlin, WI (US); Paul D. Schmirler, Glendale, WI (US); Alex L. Nicoll, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 315 days.

(21) Appl. No.: 16/796,641

(22) Filed: Feb. 20, 2020

(65) Prior Publication Data
US 2021/0263168 A1 Aug. 26, 2021

(51) Int. Cl.
*G01S 19/51* (2010.01)
*G06F 16/248* (2019.01)
*G06F 16/29* (2019.01)
*G01S 19/39* (2010.01)

(52) U.S. Cl.
CPC ............ *G01S 19/51* (2013.01); *G01S 19/396* (2019.08); *G06F 16/248* (2019.01); *G06F 16/29* (2019.01)

(58) Field of Classification Search
CPC ...... A63F 13/332; G01S 19/396; G01S 19/51; G02B 27/017; G02B 27/0179; G06F 3/01; G06F 3/011; G06F 3/012; G06F 3/013; G06F 3/017; G06F 3/0346; G06F 3/0484; G06F 3/04815; G06F 3/1454; G06F 16/248; G06F 16/29; G06K 9/6218; G06T 15/40; G06T 19/006; G09G 5/14

USPC .................................................... 340/539.13
See application file for complete search history.

(56) References Cited

U.S. PATENT DOCUMENTS

| | | | |
|---|---|---|---|
| 5,699,444 | A | 12/1997 | Palm |
| 7,190,331 | B2 | 3/2007 | Genc et al. |
| 10,198,865 | B2 | 2/2019 | Kezele et al. |
| 10,339,721 | B1* | 7/2019 | Dascola .................... G06T 7/80 |
| 10,638,265 | B1* | 4/2020 | Morton .................... G01S 19/51 |

(Continued)

OTHER PUBLICATIONS

Yan Yan, Registration Issues in Augmented Reality, Computer Science, University of Birmingham.
(Continued)

*Primary Examiner* — Stephen R Burgdorf
(74) *Attorney, Agent, or Firm* — Fletcher Yoder, P.C.

(57) ABSTRACT

A system includes a computing system configured to communicatively couple to a database configured to store a virtual coordinate system and a plurality of features associated with a representative environment associated with the virtual coordinate system. The computing system is configured to receive a first input indicative of a physical positioning of a user in a physical environment, determine a virtual positioning of the user in the virtual coordinate system based on the first input, receive a second input indicative of an updated physical positioning of the user in the physical environment, determine an updated virtual positioning of the user in the virtual coordinate system based on the second input, and output a first signal to a computing device in response to determining the updated virtual positioning of the user in the virtual coordinate system.

20 Claims, 14 Drawing Sheets

(56) References Cited

U.S. PATENT DOCUMENTS

| | | | | |
|---|---|---|---|---|
| 10,943,395 | B1* | 3/2021 | Green | G06F 3/04847 |
| 2010/0185529 | A1 | 7/2010 | Chesnut et al. | |
| 2012/0249741 | A1* | 10/2012 | Maciocci | G06T 19/006 |
| | | | | 348/51 |
| 2014/0247279 | A1* | 9/2014 | Nicholas | G06T 19/006 |
| | | | | 345/633 |
| 2016/0217614 | A1* | 7/2016 | Kraver | G02B 27/017 |
| 2017/0123750 | A1* | 5/2017 | Todasco | G06F 21/6209 |
| 2018/0060333 | A1* | 3/2018 | Bosch | H04L 67/38 |
| 2019/0333480 | A1* | 10/2019 | Lang | G06F 3/011 |
| 2019/0369404 | A1* | 12/2019 | Joshi | H04W 4/021 |

OTHER PUBLICATIONS

Heen Chen, Hanwu He, Jianqing Mo, Jinfang Li & Xian Yang (2016), 3D registration based perception in augmented reality environment, Cogent Engineering, 3:1, 1263037.

Karwee Chia, Adrian David Check, and Simon J.D. Prince, Online 6 DOF Augmented Reality Registration from Natural Features, Proceedings of the 1st International Symposium on Mixed and Augmented Reality, Sep. 2002.

Eric Ragan, Curtis Wilkes, Doug A. Bowman, and Tobias Hollerer, Simulation of Augmented Reality Systems in Purely Virtual Environments, Department of Computer Science.

Xiang Ren, Min Sun, Cheng Jiang, Lei Liu, and Wei Huang, An Augmented Reality Geo-Registration Method for Ground Target Localization from a Low-Cost UAV Platform, Sensors 2018,18, 3739, Nov. 2, 2018.

Matching in 2D, Chapter 11, Computer Vision: Mar. 2000, 40 Pages.

"Spatial Anchors", Microsoft, accessed Aug. 19, 2019, 4 pages, https://docs.microsoft.com/en-us/windows/mixed-reality/design/spatial-anchors.

"Cloud Anchors allow different users to share AR experiences", ARCore Google Developers, accessed Aug. 19, 2019, 4 pages, https://developers.google.com/ar/develop/cloud-anchors.

Wagner, Daniel et al. "Pose Tracking from Natural Features on Mobile Phones", 7th IEEE and ACM International Symposium on Mixed and Augmented Reality, ISMAR 2008, Sep. 2008, 11 pages, Cambridge, UK, https://www.researchgate.net/publication/221221008_Pose_tracking_from_natural_features_on_mobile_phones.

Ren, Xiang et al. "An Augmented Reality Geo-Registration Method for Ground Target Localization from a Low-Cost UAV Platform", Sensors, Nov. 2, 2018, 19 pages, vol. 18(11) 3739, Basel, Switzerland, https://www.ncbi.nlm.nih.gov/pmc/articles/PMC6263998/.

Insider Navigation, "Insider Navigation Product Explanation", YouTube, Apr. 23, 2018, 1:30 minutes,1 page, https://www.youtube.com/watch?v=5jChhK5km3E.

Awe, "Clemens Kirner (CEO, Insider Navigation): How We See Buildings in the Future with AR", YouTube, Jun. 9, 2017, 16:20 minutes, 1 page, https://www.youtube.com/watch?v=8UcIWcFUf54.

* cited by examiner

SYSTEM AND METHOD TO DETERMINE POSITIONING IN A VIRTUAL COORDINATE SYSTEM

BACKGROUND

The present disclosure relates generally to presenting virtual features to a user. More particularly, embodiments of the present disclosure are related to systems and methods for associating a position of a user in a physical environment with a corresponding virtual position of the user in a virtual coordinate system to present the virtual features.

This section is intended to introduce the reader to various aspects of art that may be related to various aspects of the present techniques and are described and/or claimed below. This discussion is believed to be helpful in providing the reader with background information to facilitate a better understanding of the various aspects of the present disclosure. Accordingly, it should be noted that these statements are to be read in this light, and not as admissions of prior art.

Users may be responsible for performing tasks, such as for industrial systems that are geographically remote from one another. For example, the user may be a technician that may perform a variety of tasks, such as performing maintenance on a component of an industrial system, communicating with other technicians (e.g., from other industrial systems), acquiring information regarding the industrial system, and the like. However, traveling between different areas to perform each task may expend significant time and resources, thereby reducing an efficiency of the workers. Accordingly, it is desirable to develop ways to facilitate the workers to perform tasks without having to constantly move the workers between different areas.

BRIEF DESCRIPTION

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes a computing system configured to communicatively couple to a database configured to store a virtual coordinate system and a plurality of features associated with a representative environment associated with the virtual coordinate system. The computing system is configured to receive a first input indicative of a physical positioning of a user in a physical environment, determine a virtual positioning of the user in the virtual coordinate system based on the first input, receive a second input indicative of an updated physical positioning of the user in the physical environment, determine an updated virtual positioning of the user in the virtual coordinate system based on the second input, and output a first signal to a computing device in response to determining the updated virtual positioning of the user in the virtual coordinate system.

In another embodiment, a non-transitory computer-readable medium includes computer-executable instructions that, when executed by a processor, are configured to cause the processor to receive a first input indicative of a first physical positioning of a first user in a first physical environment and determine a first virtual positioning of the first user in a virtual coordinate system based on the first input, in which the first virtual positioning corresponds to the first physical positioning. The instructions are also configured to cause the processor to receive a second input indicative of a second physical positioning of the first user in the first physical environment and determine a second virtual positioning of the first user in the virtual coordinate system based on the second input, in which the second virtual positioning corresponds to the second physical positioning, and output a first signal to a first computing device based on the second virtual positioning of the user in the virtual coordinate system.

In another embodiment, a method includes receiving, via a processor, an input indicative of a physical positioning of a user in a physical environment, determining, via the processor, a virtual positioning of the user in a virtual coordinate system based on the input, and determining, via the processor, a representative positioning of the user in a representative environment, in which the representative environment is associated with the virtual coordinate system. The method also includes outputting, via the processor, a signal configured to cause a computing device to present a feature associated with the representative environment via an electronic display based on the virtual positioning of the user in the virtual coordinate system.

DRAWINGS

These and other features, aspects, and advantages of the present disclosure will become better understood when the following detailed description is read with reference to the accompanying drawings in which like characters represent like parts throughout the drawings, wherein.

Figure 13:
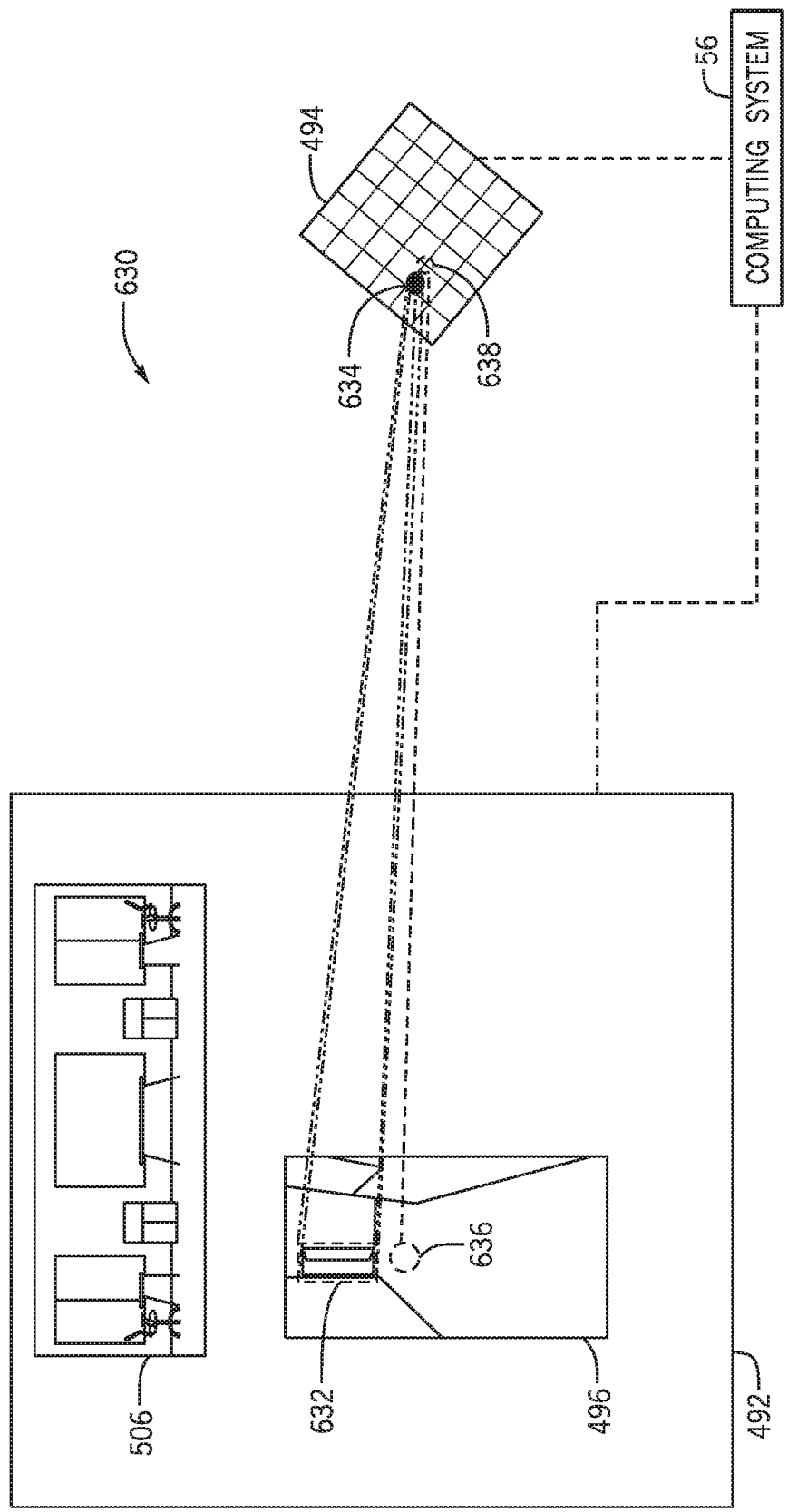
Figure 14:
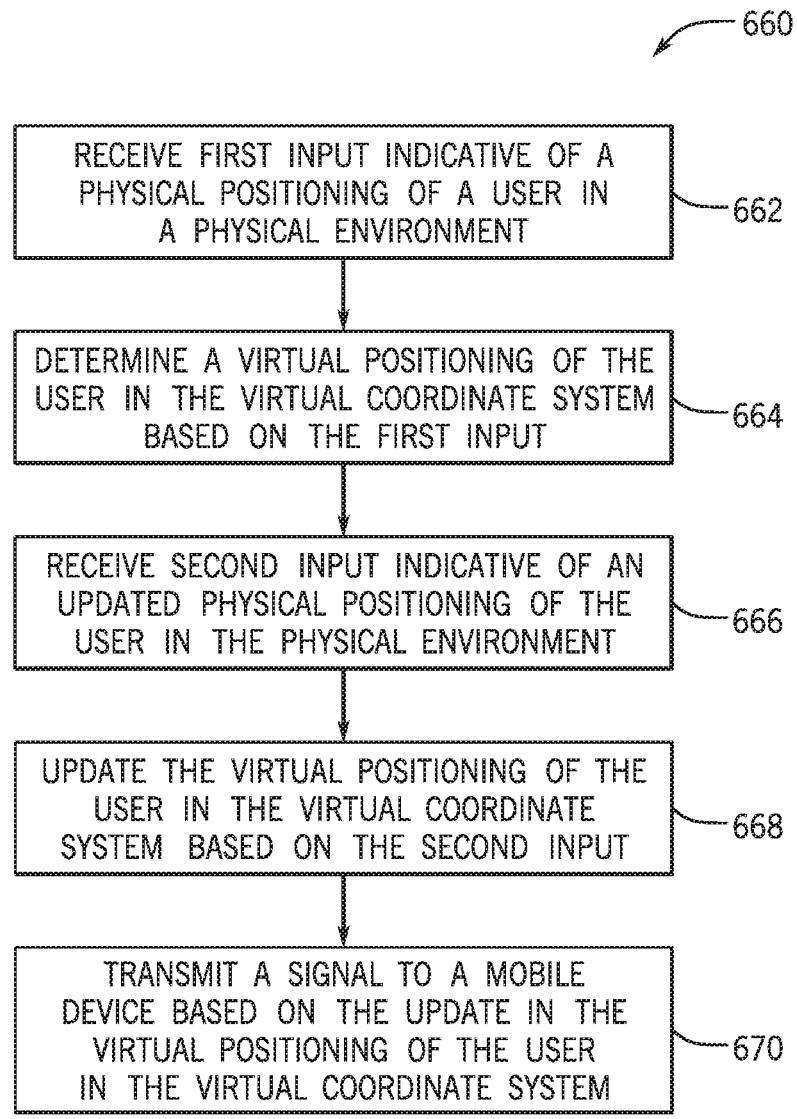

FIG. 13 is a diagram of an embodiment of a mapping method for mapping a user from a physical environment into the virtual coordinate system using image recognition on a captured image of a portion of the physical environment, in accordance with an embodiment of the present disclosure; and FIG. 14 is a flowchart of an embodiment method for tracking movement of a user in a virtual coordinate system, in accordance with an embodiment of the present disclosure.

DETAILED DESCRIPTION

One or more specific embodiments of the present disclosure will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

For organizations that provide services to many areas, such as many rooms, buildings, geographic environments, and so forth, it may be beneficial to perform tasks remotely. In an example, it may be beneficial for users who are located in different areas to be able to interact with one another in a shared virtual or augmented environment, such as for facilitating communication amongst one another. However, it may be difficult to coordinate positioning of each user in the same virtual environment at the same time.

Thus, it may be beneficial to position a user in a virtual coordinate system that represents a virtual environment, a physical environment, or both, to facilitate completion of tasks. Accordingly, embodiments of the present disclosure are directed to a system that may calibrate a physical environment of a user with the virtual coordinate system to determine a positioning of the user in the virtual coordinate system. Based on the positioning of the user in the virtual coordinate system, the system may determine various features to present to the user, such as features related to the environment (e.g., a representative environment) represented by the virtual coordinate system.

For example, the user may communicate with a computing system (e.g., via a mobile device of the user) to associate a location of the physical environment with a corresponding location in the virtual coordinate system. Based on a calibration process, the computing system may determine a starting position (e.g., a [0,0,0] x-y-z coordinate) and/or a starting orientation (e.g., a [0,0,0,0] x-y-z-w quaternion) of the user in the virtual coordinate system and therefore in the representative environment. The computing system may present certain features (e.g., images, information) to the user based on the position and/or movement of the user in the virtual coordinate system with respect to the starting positions. For instance, a component (e.g., the mobile device) may monitor movement of the user in the physical environment and may transmit the movement to the computing system for determining corresponding movement of the user in the virtual coordinate system, such as movement deviating from the starting position (e.g., deviating from the starting [0,0,0] x-y-z coordinate) and/or from the starting orientation (e.g., deviating from the [0,0,0,0] x-y-z-w quaternion) of the user. Based on the movement of the user in the virtual coordinate system, the computing system may update the features presented to the user, such as to emulate movement of the user in the representative environment, thereby immersing the user in the representative environment.

In some embodiments, the component may use an inertial measurement unit (IMU) to determine movement of the user. The IMU may monitor a change in positioning of the user in the physical environment, and the position tracking system may use the monitored change in positioning of the user in the physical environment to determine a corresponding change in positioning of the user in the virtual coordinate system. In other words, the position tracking system monitors movement of the user to determine a deviation from a previous positioning of the user to an updated positioning of the user. In this way, the computing system may monitor the position and movement of the user without the use of external equipment, such as cameras. Furthermore, such techniques may enable the positioning of the user to be monitored when the user is at any physical location. For instance, the virtual coordinate system may correspond to a particular physical environment (e.g., an office) of the user. However, the positioning of the user may be continuously monitored even when the user is positioned external to the physical environment (e.g., the user is in a residential home instead of at the office). In this way, the positioning of the user in the virtual coordinate system may be continuously determined, and the user does not have to recalibrate or re-associate a physical positioning of the user with a virtual positioning of the user each time the user leaves the physical environment. In other words, the physical positioning of the user in the physical environment remains accurately associated with the same virtual positioning of the user in the virtual coordinate system even after the user leaves the physical environment.

Figure 1:
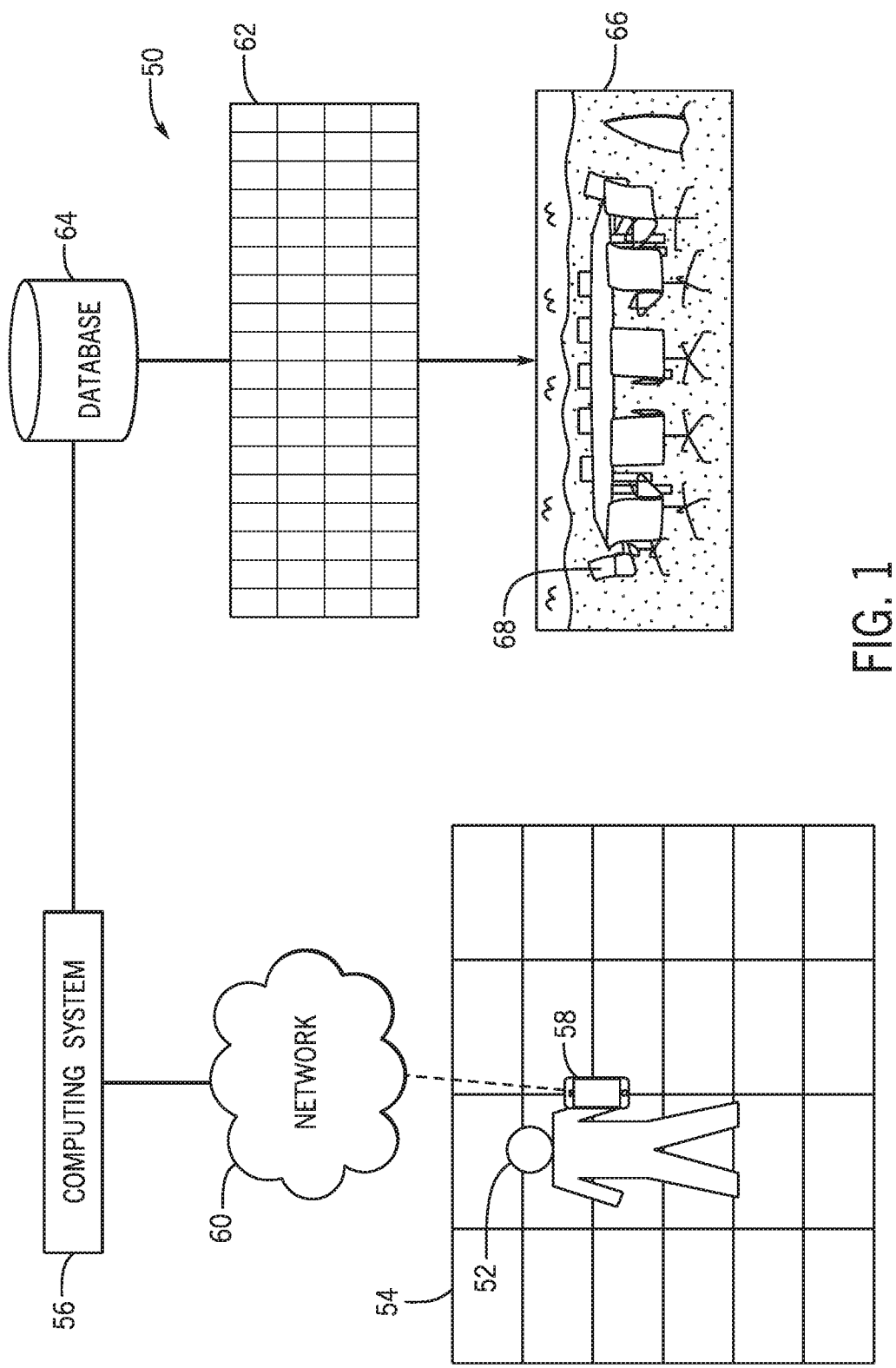
FIG. 1 is a schematic of an embodiment of a position tracking system that may be used for associating of a positioning a user with a virtual positioning of the user in a virtual coordinate system, in accordance with an embodiment of the present disclosure.

With this in mind, FIG. 1 is a schematic of an embodiment of a position tracking system 50 that may be used for monitoring a positioning of a user 52 in a physical environment 54. As used herein, the term "positioning" includes a location (e.g., placement of the device 58) and/or an orientation (e.g., direction in which the user 52 is facing). Furthermore, the physical environment 54 may include any suitable physical environment in which the user 52 is located, including an office, a warehouse, a natural environment, and so forth. The position tracking system 50 may also include a computing system 56 (e.g., a physical server and/or a cloud-based computing system) that may execute processes for monitoring the positioning of the user 52. For example, the computing system 56 may be communicatively coupled with a mobile or computing device 58 (e.g., a headset, a cellular phone, a tablet, a laptop, etc.) of the user 52 via a network 60 that permits data exchange between the computing system 56 and the mobile device 58. For instance, the network 60 may include any wired or wireless network that may be implemented as a local area network (LAN), a wide area network (WAN), cellular network, radio network, and the like. In certain implementations, the mobile device 58 may include features, such as sensors (e.g., an IMU), that may detect a change in positioning of the user 52 in the physical environment 54. The mobile device 58 may output sensor data indicative of the change in positioning to the computing system 56 to enable the computing system 56 to determine an updated positioning of the user 52. Although FIG. 1 illustrates the computing system 56, the network 60, the virtual coordinate system 62, and the database 64 as separate components, in additional embodiments, such components may be included within a single device (e.g., within the mobile device 58). Indeed, the functions of the components described herein may be local to the mobile device, remote relative to the mobile device 58, or distributed in any suitable manner (e.g., a single computing system 56 performs functions for multiple mobile devices 58 for multiple users 52).

In some embodiments, the computing system 56 may use dead reckoning techniques to determine updated positioning of the user 52. That is, the computing system 56 may calculate a current positioning of the user 52 based on a change from a previous positioning of the user 52. As an example, at a first time, the user 52 may be at a first position (e.g., at [0, 0, 0]) and a first orientation (e.g., at [0, 0, 0, 0]). Then, the user 52 may move to a second positioning at a second time, and the second positioning includes a second position and a second orientation. The mobile device 58 may determine movement, such as a linear velocity, a linear acceleration, a rotational velocity, a rotational acceleration, and the like, of the user 52 from the first positioning to the second positioning, and the mobile device 58 may transmit data indicative of such movement to the computing system 56. The computing system 56 may then determine the position and orientation of the user 52 based on the movement of the user 52 from the first positioning to the second positioning. In one example, the computing system 56 may determine that the user 52 moved (+3, −2, +1) relative to the first position (0, 0, 0) to be at the second position (3, −2, 1) and moved (+0.7, +1, 0, 1) relative to (0, 0, 0, 0) to be at a current orientation of (0.7, 1, 0, 1). In this way, the computing system 56 may determine the movement of the user 52 and apply the determined movement to a previous positioning of the user 52 to determine an updated positioning of the user 52. In other embodiments, in addition to or as an alternative to the computing system 56, the mobile device 58, may be able to determine the updated positioning of the user 52 based on the monitored movement of the user 52. As such, the mobile device 58 may be directly transmit updated positioning to the computing system 56 without having the computing system 56 calculate the updated positioning based on monitored movement of the user 52.

By using a dead reckoning techniques, the computing system 56 may track the movement of the user 52 by using a movement sensor (e.g., of the mobile device 58), which is further described below with reference to FIG. 2, and without having to use additional external sensors (e.g., an image sensor, an optical sensor) or other sensors (e.g., a global positioning system [GPS]) that directly monitors a particular location of the user 52 in the physical environment 54. As such, the dead reckoning techniques enable the position tracking system 50 to effectively track the movement of the user 52 at a limited cost associated with operation and/or implementation of the position tracking system 50. Moreover, using the dead reckoning techniques enables the position tracking system 50 to track movement of the user 52 in multiple environments. For example, external sensors may be installed at specific locations and/or have a limited range for detecting movement of the user 52. Thus, the external sensors may not be able to track movement of the user 52 at certain areas or environments that may be outside of a threshold monitoring distance of the external sensors. However, since the dead reckoning techniques are based on movement of the user 52 rather than on a particular location of the user 52, using the dead reckoning techniques enables the position tracking system 50 to determine the physical positioning of the user 52 without being limited by a particular location of the user 52 relative to other features or components of the position tracking system 50.

The computing system 56 may use the received sensor data of the positioning of the user 52 to determine a corresponding positioning of the user 52 in a virtual coordinate system 62, which may be accessed via a database 64 communicatively coupled to the computing system 56. The database 64 may include a physical memory, such as a flash memory, a hard drive, a server, and/or the database 64 may include a cloud-based database that stores the virtual coordinate system 62, such that the computing system 56 may retrieve the virtual coordinate system 62 upon communication with the database 64.

The computing system 56 may determine a starting positioning of the user 52 in the physical environment 54 and may associate the starting positioning of the user 52 in the physical environment 54 with a starting virtual positioning of the user 52 in the virtual coordinate system 62. Movement of the user 52 to change the positioning of the user 52 from the starting positioning in the physical environment 54 may therefore be used to determine a corresponding change of the positioning of the user 52 from the virtual starting positioning in the virtual coordinate system 62. Therefore, an updated positioning of the user 52 in the physical environment 54 may be associated with an updated virtual positioning of the user 52 in the virtual coordinate system 62. That is, the user 52 is considered to be "mapped into" the virtual coordinate system 62, such that the positioning of the user 52 in the physical environment 54 is used to determine the virtual positioning of the user 52 in the virtual coordinate system 62. In this way, the physical environment 54 and/or the mobile device 58 may be associated with a device coordinate system (e.g., stored in the mobile device 58) in which positionings of the device coordinate system are associated with corresponding positionings of the virtual coordinate system 62. Moreover, when the positioning of the user 52 in the physical environment 54 is not being used to determine the positioning of the user 52 in the virtual coordinate system 62, the user 52 is considered to be "mapped out" of the virtual coordinate system 62. However, as described further in detail herein, the positioning of the user 52 in the physical environment 54 may be continuously monitored even when the user 52 is mapped out of the virtual coordinate system 62. That is, the positioning of the user 52 in the physical environment 54 may still be determined, but is not used for determining the corresponding position of the user 52 in the virtual coordinate system 62.

In some implementations, the virtual coordinate system 62 is associated with a representative environment 66 that includes various information, such as features, stored in the database 64. For instance, certain locations in the virtual coordinate system 62 may be associated with certain features of the representative environment 66. Such features may be presented to the user 52 based on the determined positioning of the user 52 in the virtual coordinate system 62. For instance, the computing system 56 may send a signal to the mobile device 58 to display an image, output an audio, create a haptic feedback (e.g., a vibration), and so forth, associated with the representative environment 66 based on the positioning of the user 52 in the virtual coordinate system 62. In the illustrated example, the representative environment 66 may be a virtual environment that includes multiple chairs 68 positioned around a table. Based on the positioning of the user 52 in the virtual coordinate system 62, the computing system 56 may cause the mobile device 58 to display an image of one the chairs 68. By way of example, the mobile device 58 may use extended reality, which incorporates virtual features (e.g., virtual images) to augment physical features (e.g., real-life objects of the physical environment 54) into the representative environment 66. The mobile device 58 may present the virtual features of the representative environment 66 by overlaying such virtual features on physical features of the physical environment 54 and/or by replacing images of physical features of the physical environment 54 with the virtual features (e.g., immersing user 52 in the beach-like setting).

In additional embodiments, the representative environment 66 may be any other suitable environment represented or associated with the virtual coordinate system 62, such as the physical environment 54, another physical environment, another virtual environment, or any combination thereof. Indeed, the database 64 may store multiple virtual coordinate systems 62, such that each virtual coordinate system 62 is associated with a different representative environment 66. Additionally, a single virtual coordinate system 62 may be associated with multiple different representative environments 66. Further, multiple virtual coordinate systems 62 may be associated with the same representative environment 66 (e.g., different versions or copies of the same representative environment 66 to perform different activities or purposes). In any case, a single mobile device 58 may access any number of virtual coordinate systems 62 and corresponding representative environments 66. In this manner, a particular representative environment 66 may be accessed by the computing system 56 for displaying features associated with a particular representative environment 66 to the user 52. By way of example, the user 52 may select (e.g., via the mobile device 58) a certain virtual coordinate system 62 and/or a certain representative environment 66 in which the user 52 desires to be monitored.

Figure 2:
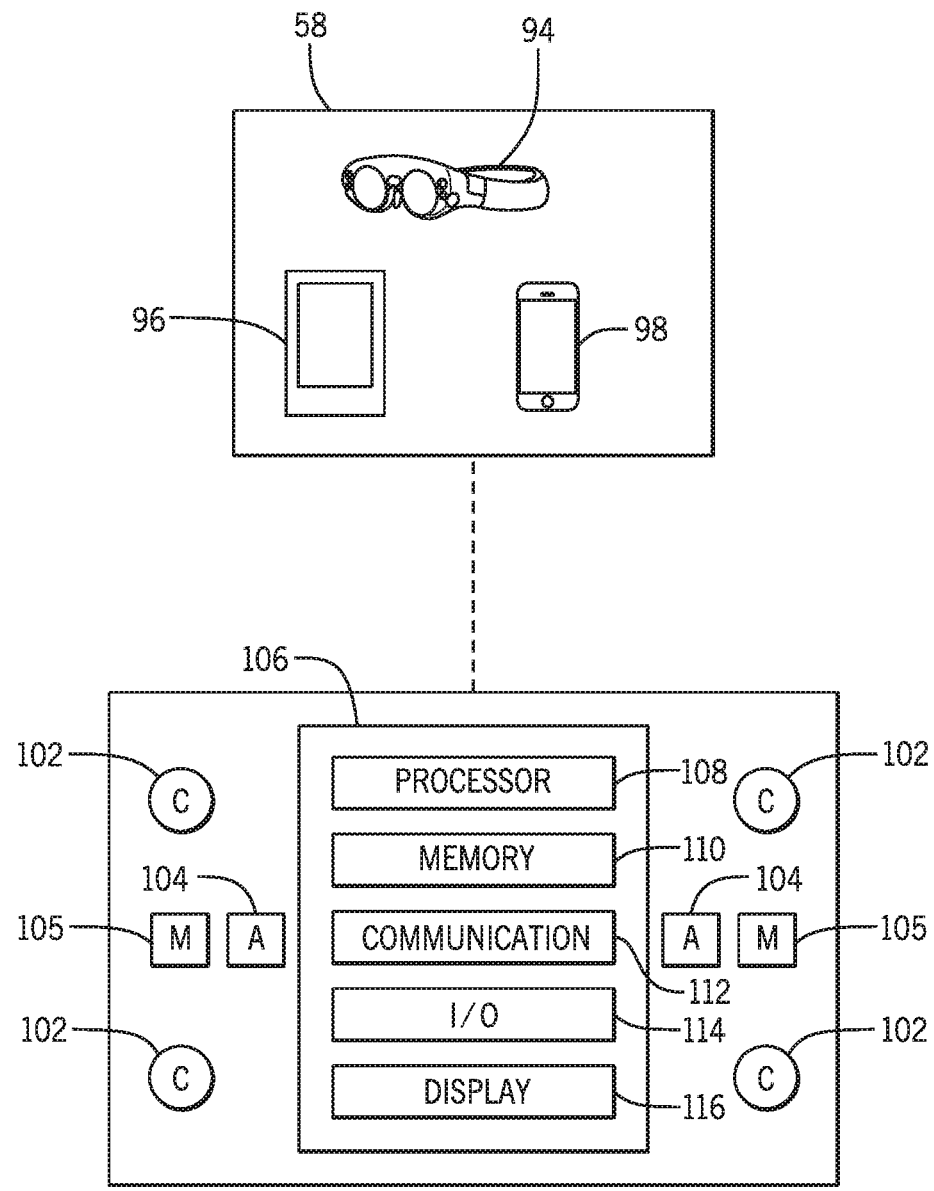
FIG. 2 is a schematic of an embodiment of a mobile device that may be utilized by a position tracking system, in accordance with an embodiment of the present disclosure.

FIG. 2 is a schematic of an embodiment of the mobile device 58 that may be employed within the position tracking system 50 for performing the techniques described herein. As an example, the mobile device 58 may include a headset 94, a tablet 96, a mobile phone 98, another suitable mobile device 58, or any combination thereof. The mobile device 58 may include one or more cameras or image sensors 102 and/or one or more audio sensors 104 (e.g., microphones). The position tracking system 50 may receive image data via the camera(s) 102 and audio data via the audio sensors(s) 104. It should be noted that although FIG. 2 illustrates the mobile device 58 as having four cameras 102 and two audio sensors 104, the mobile device 58 may have any suitable number of cameras 102 and audio sensors 104, such as a single camera 102 and/or a single audio sensor 104. Additionally, the mobile device 58 may include movement or motion sensors 105, such as an accelerometer, a gyroscope, an IMU, another suitable movement sensor, or any combination thereof, that may determine movement of the user 52. Sensor feedback transmitted by the movement sensors 105 may therefore be used for determining the positioning of the user 52. In additional embodiments, the mobile device 58 may include other sensors, such as sensors for determining haptic data (e.g., a capacitive sensor), for determining a geographic location of the user 52 (e.g., GPS), for determining a presence of an object (e.g., a proximity sensor or depth camera), a communication sensor, and/or any other suitable sensor for determining parameters associated with the user 52 and/or with the physical environment 54.

Additionally, the mobile device 58 may include processing circuitry 106 having a processor 108, a memory 110, a communication component 112, input/output (I/O) 114, a display 116, and the like. The communication component 112 may be a wireless or a wired communication component that may facilitate establishing a connection with the network 60 to facilitate communication between the mobile device 58 and the computing system 56. This wired or wireless communication component may include any suitable communication protocol including Wi-Fi, mobile telecommunications technology (e.g., 2G, 3G, 4G, 5G, LTE), Bluetooth®, near-field communications technology, and the like. The communication component 112 may include a network interface to enable communication via various protocols such as EtherNet/IP®, ControlNet®, DeviceNet®, or any other industrial communication network protocol.

The processor 108 of the computing system 100 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 108 may, in some embodiments, include multiple processors. The memory 110 may include any suitable articles of manufacture that serve as media to store processor-executable code, data, and the like. The memory 110 may store data, such as to reference for operation of the mobile device, non-transitory processor-executable code used by the processor 108 to perform the presently disclosed techniques, such as for determining the positioning of the user 52.

The I/O ports 114 may be used for communicatively coupling the mobile device 58 to other external devices, such as the computing system 56. Furthermore, the display 116 may be any suitable image-transmitting component that displays an image. For example, the display 116 may be a display screen that combines real-world image data associated with the physical environment 54 with virtually generated image data associated with virtually generated elements to supplement the real-world image data. In another example, the mobile device 58 may include a transparent display to enable the user 52 to view the real-world surroundings, and the display 116 may display virtually generated content that is superimposed over the transparent display to produce virtual elements within the real-world surroundings.

Furthermore, in some embodiments, the mobile device 58 may include a user interface with which the user 52 may interact with to cause the computing system 56 to perform an action associated with the virtual coordinate system 62. For instance, the user interface may include a touch screen (e.g., as a part of the display 116), an eye-tracking sensor, a gesture (e.g., hand) tracking sensor, a joystick or physical controller, a button, a knob, a button, a switch, a dial, a trackpad, a mouse, another component, or any combination thereof. As an example, the user may utilize the interface for mapping into the virtual coordinate system 62, for selecting the virtual coordinate system 62 and/or the representative environment 66, for viewing certain information regarding the virtual coordinate system 62 and/or the representative environment 66, and so forth.

It should be noted that the computing system 56 may include one or more components similar to the processing circuitry 106. For instance, the computing system 56 may be a cloud-computing device that is separate from the mobile device 58, and the computing system 56 may include a separate processor 108 that receives sensor feedback from the movement sensors 105 for determining the positioning of the user 52. In this way, the mobile device 58 may not directly determine the positioning of the user 52. Rather, the mobile device 58 may send data to the computing system 56 such that the positioning of the user 52 is determined externally from the mobile device 58, and the computing system 56 may transmit data regarding the determined positioning of the user 52 back to the mobile device 58. Indeed, the respective processing circuitry 106 of the computing system 56 may enable the computing system 56 to communicate with the mobile device 58 for performing the techniques described herein.

In some circumstances, various users located at different remote, physical environments may desire to communicate to interact with one another in a virtual face-to-face manner. For example, a first user who is in a first physical environment may view the location (e.g., relative to the first user), movement, and appearance of a second user who is in a second physical environment, and the two users may interact with one another as if the two users were located at the same environment (e.g., the same office space). Thus, the two users may appear to be in the same environment because the two users share the same virtual coordinate system and representative environments. Such techniques may facilitate the users to communicate to one another, such as by emulating real world interactions. Furthermore, the users may desire to meet in a particular virtual environment. For instance, each user may be physically located in their respective residential homes, but the users may desire to interact in a virtual office space that is more conducive to facilitating communication between the users, further enhancing the interaction between the users.

Figure 3:
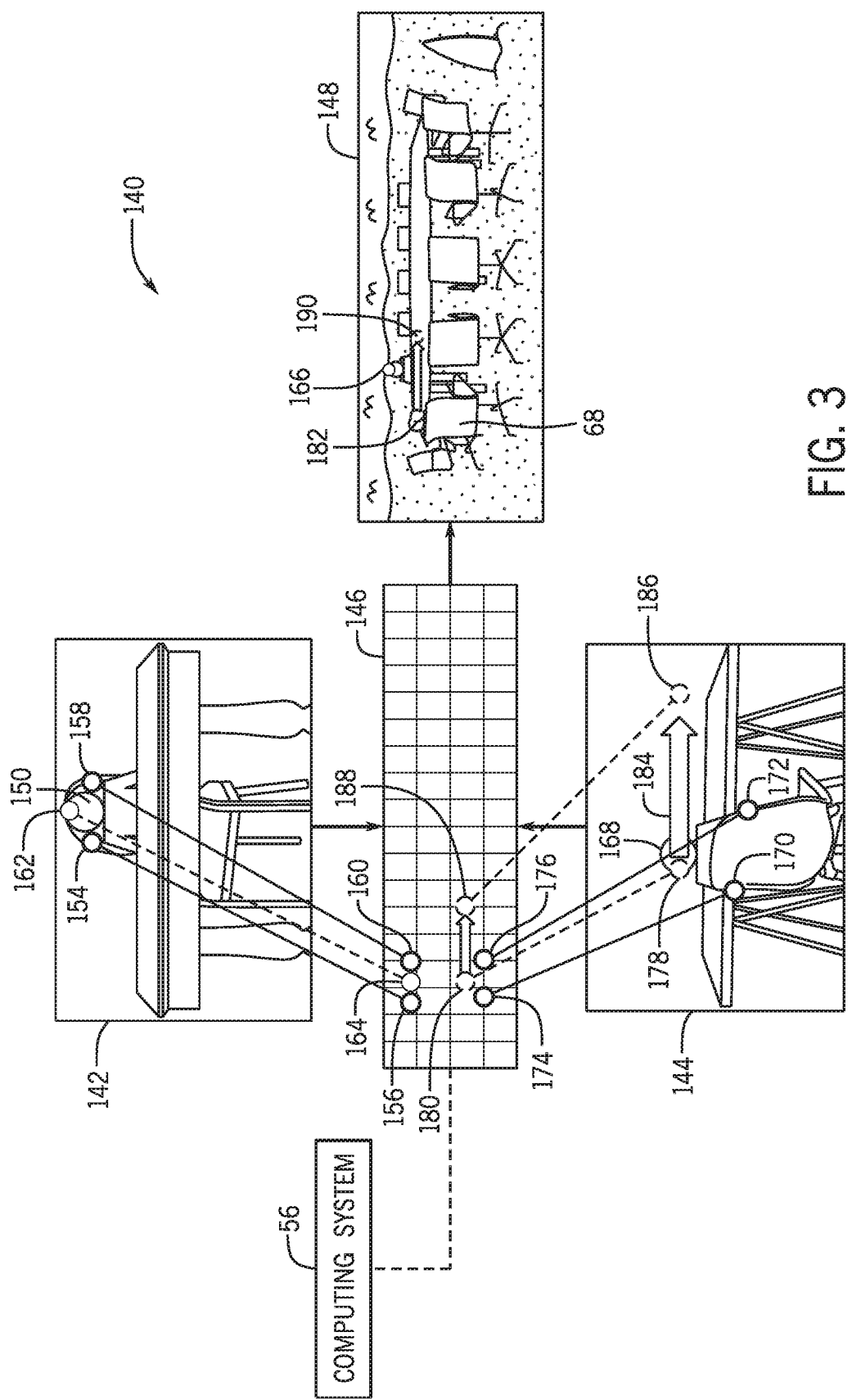
FIG. 3 is a schematic of an embodiment of a mapping arrangement in which elements are mapped into a virtual coordinate system representing a virtual environment, in accordance with an embodiment of the present disclosure.

To this end, FIG. 3 is a schematic of an embodiment of a first mapping arrangement 140 illustrating how elements from a first physical environment 142 and from a second physical environment 144 are mapped into a virtual coordinate system 146 representing a virtual environment 148. For example, a first user 150 may be located in the first physical environment 142. In order to map into the virtual coordinate system 146, the first user 150 may indicate a first association between a first physical location 154 of the first physical environment 142 with a first virtual location 156 of the virtual coordinate system 146, and the first user 150 may indicate a second association between a second physical location 158 of the first physical environment 142 with a second virtual location 160 of the virtual coordinate system 146. For instance, as further described below with respect to FIG. 4, the first user 150 may use a particular mobile device 58 to indicate the physical locations 154, 158 are associated with selected locations of the virtual environment 148, and the selected locations of the virtual environment 148 correspond to the virtual locations 156, 160 of the virtual coordinate system 146. In the illustrated embodiment, the first user 150 may select the first virtual locations 156, 160 that are adjacent to one of the chairs 68 in order to be positioned in (e.g., seated in) the selected chair 68 in the virtual environment 148.

The computing system 56 may then calibrate the virtual coordinate system 146 to match with the first physical environment 142 (e.g., a device coordinate system associated with the first physical environment 142). That is, based on the association and/or relationship between the first physical location 154 and the first virtual location 156 and the relationship between the second physical location 158 and the second virtual location 160, the computing system 56 may determine various other physical locations of the first physical environment 142 associated with corresponding virtual locations of the virtual coordinate system 146. By way of example, the virtual coordinate system 146 may include multiple virtual coordinate points, the device coordinate system of the first physical environment 142 may have multiple device coordinate points, and the computing system 56 may associate each device coordinate point of the device coordinate system with a corresponding virtual coordinate point of the virtual coordinate system 146, thereby mapping the first physical environment 142 with the virtual coordinate system 146.

The computing system 56 may then determine the positioning of the first user 150 in the virtual coordinate system 146 based on the mapping of the first physical environment 142 with the virtual coordinate system 146. For instance, the computing system 56 may receive (e.g., via user input by the first user 150, via a sensor such as GPS) a first physical positioning 162, such as a device coordinate point, of the first user 150 in the first physical environment 142. The first physical positioning 162 may include a first relationship with any of the physical locations 154, 158. The computing system 56 may then determine a corresponding first virtual positioning 164 of the first user 150 associated with the first physical positioning 162, such as based on the association between the device coordinate system with the virtual coordinate system 146. The first virtual positioning 164 may have a second relationship with any of the virtual locations 156, 160, and the second relationship between the first virtual positioning 164 and the virtual locations 156, 160 may correspond with the first relationship between the first physical positioning 162 and the physical locations 154, 158. For instance, the location and orientation of the first user 150 associated with the first virtual positioning 164 may correspond to a location and orientation of the first user 150 associated with the first physical positioning 162. As an example, a distance, a facing direction, an angle, a placement, and the like, of the first physical positioning 162 in the device coordinate system may be used to determine a corresponding distance, a corresponding facing direction, a corresponding angle, a corresponding placement, and so forth, of the first virtual positioning 164 in the virtual coordinate system 146 based on a calibration between the first physical environment 142 and the virtual coordinate system 146. Such details are further discussed with respect to FIGS. 4-8 below.

Moreover, based on the determined first virtual location 156 of the first user 150, the computing system 56 may present the virtual environment 148 to the first user 150 accordingly. For instance, the first virtual positioning 164 may be associated with a first representative positioning 166 of the first user 150 in the virtual environment 148. As such, features of the virtual environment 148 (e.g., the chairs 68) may be displayed at various locations, orientations, and other manners to the first user 150 to emulate how the first user 150 is positioned and/or oriented in the first representative positioning 166 (e.g., by emulating a perspective of the first user 150 in the first representative positioning 166).

Similarly, a second user 168 located in the second physical environment 144 may map into the virtual coordinate system 146 by selecting a third physical location 170 and a fourth physical location 172 of the second physical environment 144 and by selecting a third virtual location 174 associated with the third physical location 170 and a fourth virtual location 176 associated with the fourth physical location 172. The second user 168 may be determined to be at a second physical positioning 178 and, based on the position of the second physical positioning 178 relative to the third physical location 170 and to the fourth physical location 172, the computing system 56 may determine a second virtual positioning 180 within the virtual coordinate system 146 associated with the second positioning system 178 of the second user 168. Moreover, the second virtual positioning 180 may be associated with a second representative positioning 182 of the second user 168 in the virtual environment 148. Accordingly, the computing system 56 may cause features of the virtual environment 148 to be presented to the second user 168 to emulate how the second user 168 is positioned and/or oriented in the second representative positioning 182. Further, the computing system 56 may present an image (e.g., an avatar) of the first user 150 to the second user 168 based on the first representative positioning 166 of the first user 150 relative to the second representative positioning 182 of the second user 168. Likewise, the computing system 56 may present another image of the second user 168 to the first user 150 based on the second representative positioning 182 of the second user 168 relative to the first representative positioning 166 of the first user 150. Thus, the first user 150 and the second user 168 may view one another in the virtual environment 148 based on the respective virtual positionings 164, 180 of the first user 150 and the second user 168 relative to one another.

Furthermore, changes associated with the physical positionings 162, 178 of the respective users 150, 168 may be monitored and applied to determine corresponding changes to the respective virtual positionings 164, 180 and to change how the features of the virtual environment 148 are presented to the users 150, 168. In the illustrated embodiment, the computing system 56 determines (e.g., via the dead reckoning techniques) the second user 168 has moved in a direction 184 to a third physical positioning 186 in the second physical environment 144. Based on the calibration of the second physical environment 144, the computing system 56 may determine that the third physical positioning 186 corresponds to a third virtual positioning 188 in the virtual coordinate system 146. By way of example, the computing system 56 may determine an amount of physical movement associated with the second user 168 moving from the second physical positioning 178 to the third physical positioning 186, and the computing system 56 may determine a corresponding amount of movement from the second virtual positioning 180 based on the calibration between the second physical environment 144 and the virtual coordinate system 146. Additionally, the computing system 56 may also determine that the third virtual positioning 188 corresponds to a third representative positioning 190 of the second user 168 in the virtual environment 148. Accordingly, the computing system 56 may update features presented to both the first user 150 and the second user 168 based on the updated positioning of the second user 168 in the virtual environment 148. For instance, the computing system 56 may update the positioning of the image of the second user 168 presented to the first user 150 to emulate the second user 168 moving from the second representative positioning 182 to the third representative positioning 190 within the virtual environment 148. Additionally, the computing system 56 may update the features of the virtual environment 148 presented to the second user 168 to emulate the second user 168 being positioned and/or oriented in the third representative positioning 190.

Further, although FIG. 3 illustrates that the first user 150 and the second user 168 are located in different physical environments 142, 144, in additional embodiments, the first user 150 and the second user 168 may map into the virtual coordinate system 146 from the same physical environment. Moreover, the virtual coordinate system 146 may be calibrated to match the same physical environment in different manners based on the virtual locations selected by the users 150, 168. For example, a first movement of the first user 150 (e.g., taking a step forward) in the physical environment may cause a corresponding second movement (e.g., taking the same step forward) of the first user 150 in the virtual coordinate system 146. However, a similar first movement of the second user 168 (e.g., taking a step forward) in the same physical environment may cause a corresponding third movement (e.g., taking two steps forward) of the second user 168 in the virtual coordinate system 146, in which the third movement is substantially different (e.g., includes a substantially larger position and/or orientation change) than the second movement. In other words, even though the first user 150 and the second user 168 map from the same physical environment into the same virtual coordinate system 146, the different manners or methods in which the first user 150 and the second user 168 are mapped into the virtual coordinate system 146 may change how features of the virtual environment 148 are presented differently to the first user 150 and to the second user 168. Accordingly, features of the same virtual environment 148 may be presented differently to the first user 150 relative to that presented to the second user 168, even though the first user 150 and the second user 168 are mapped into the virtual coordinate system 146 from the same physical environment.

As mentioned above, in order to associate various locations of a physical environment with corresponding locations of a virtual coordinate system, a calibration process may be performed. For instance, the first user 150 may desire to associate a first physical location within an office with a first virtual location in the virtual coordinate system, and the first user 150 may desire to associate a second physical location within the office with a second virtual location in the virtual coordinate system. Based on the calibration of the first physical location with the first virtual location and the second physical location with the second virtual location, further physical locations (e.g., relative to the first and second physical locations) may be associated with corresponding virtual locations (e.g., relative to the first and second virtual locations) as will be further described below (e.g., using a transformation matrix). Indeed, physical locations both within the office and external to the office may be associated with corresponding virtual locations in the virtual coordinate system.

Figure 4:
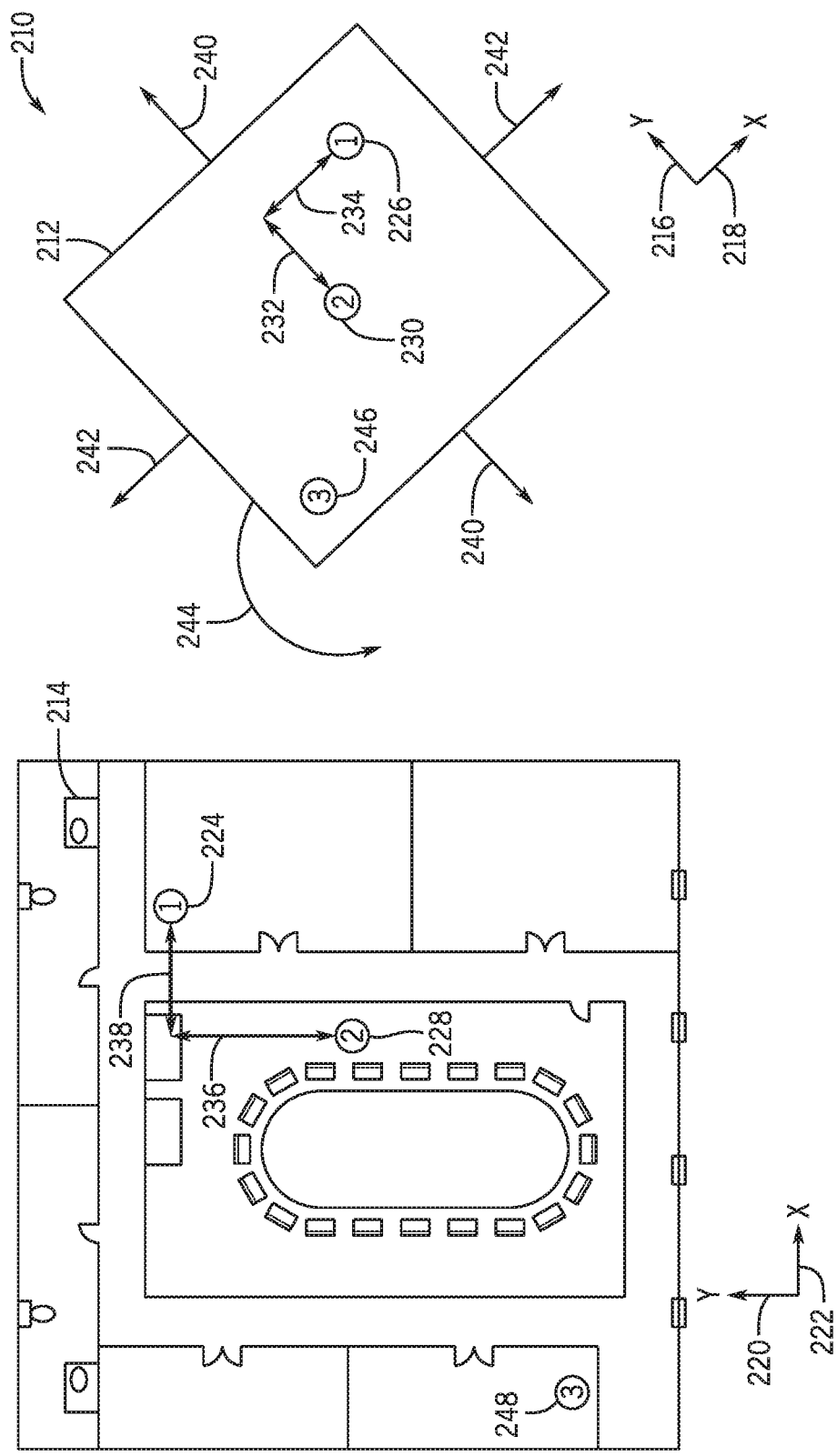
FIG. 4 is a diagram illustrating an embodiment of a method of calibrating a virtual coordinate system to match a device coordinate system, in accordance with an embodiment of the present disclosure.

FIG. 4 is a diagram 210 illustrating an embodiment of a method of calibrating a virtual coordinate system 212 to match a device coordinate system 214 (e.g., coordinates of the mobile device 58) associated with a physical environment. The virtual coordinate system 212 may be associated with a first y-axis or direction 216 and a first x-axis or direction 218. Similarly, the device coordinate system 214 may be associated with a second y-axis or direction 220 and a second x-axis or direction 222. In the illustrated diagram 210, a first physical location 224 of the device coordinate system 214 is selected and matched with a first virtual location 226 of the virtual coordinate system 212. Moreover, a second physical location 228 of the device coordinate system 214 is selected and matched with a second virtual location 230 of the virtual coordinate system 212.

As an example, the mobile device 58 may display a representative environment associated with the virtual coordinate system 212 to a user (e.g., the first user 150). The user may navigate to a first location in the physical environment and may indicate (e.g., via the mobile device 58) that the first location is the first physical location 224. Moreover, the user may use the mobile device 58 (e.g., via a touchscreen) to indicate that a particular location of the representative environment is associated with the first physical location 224. The particular location of the representative environment corresponds to the first virtual location 226 of the virtual coordinate system 212 and therefore, the computing system 56 associates the first physical location 224 with the first virtual location 226.

Similarly, the user may navigate to a second location in the physical environment and may indicate that the second location is the second physical location 228. As the user navigates from the first location to the second location in the physical environment, the movement of the user is monitored such that the physical positioning of the user may be determined when the user is at the second location. For instance, the computing system 56 determines the physical positioning is associated with (e.g., includes) the second physical location 228 and includes a first relationship relative to the first physical location 224. At the second location in the physical environment, the user may indicate that the second location is associated with the second physical location 228, and the user may also indicate that an additional particular location of the representative environment is associated with the second physical location 228. The additional particular location of the representative environment is associated with the second virtual location 230 of the virtual coordinate system, and the computing system 56 may therefore associate the second physical location 228 with the second virtual location 230. In some embodiments, after associating the second physical location 228 with the second virtual location 230, the computing system 56 may then determine the virtual positioning of the user in the virtual coordinate system 212. For example, the virtual positioning may be associated with the second virtual location 230 and may include a second relationship relative to the first virtual location 226, in which the second relationship between the virtual positioning and the first virtual location 226 corresponds with the first relationship between the physical positioning and the first physical location 224.

Furthermore, virtual coordinate system 212 may then be calibrated to match the device coordinate system 214 based on the physical locations 224, 228 and the virtual locations 226, 230. For instance, the virtual coordinate system 212 may be calibrated such that the relationship between the first virtual location 226 and the second virtual location 230 substantially matches the relationship between the first physical location 224 and the second physical location 228. In the illustrated example, the first virtual location 226 and the second virtual location 230 may be separated along the first y-axis 216 by a first y-distance 232, and the first virtual location 226 and the second virtual location 230 may be separated along the first x-axis 218 by a first x-distance 234. Moreover, the first physical location 224 and the second physical location 228 may be separated along the second y-axis 220 by a second y-distance 236, and the first physical location 224 and the second physical location 228 may be separated along the second x-axis 220 by a second x-distance 238. Accordingly, the computing system 56 may scale the virtual coordinate system 212 such that a length of the first y-distance 232 of the virtual coordinate system 212 substantially matches a length of the second y-distance 236 of the device coordinate system 214. For example, the virtual coordinate system 212 may be scaled in the first direction 240 along the first y-axis 216 to increase the length of the first y-distance 232 until the length of the first y-distance 232 substantially matches the length of the second y-distance 236. Similarly, the computing system 56 may modify the scaling of the virtual coordinate system 212 such that a length of the first x-distance 234 of the virtual coordinate system 212 substantially matches a length of the second x-distance 238 of the device coordinate system 214. As an example, the virtual coordinate system 212 may be lengthened in the second direction 242 along the first x-axis 218 until the length of the first x-distance 234 substantially matches the length of the second x-distance 238.

In addition, the computing system 56 may calibrate (e.g., orient) the virtual coordinate system 212 to align the first y-distance 232 with the second y-distance 236 and to align the first x-distance 234 with the second x-distance 238. To this end, the computing system 56 may rotate the virtual coordinate system 212 in a rotational direction 244. By way of example, after the virtual coordinate system 212 has been scaled as described above, the computing system 56 may translate the virtual coordinate system 212 over the device coordinate system 214 to overlay the first physical location 224 with the first virtual location 226, connect the second physical location 228, the second virtual location 230, and the overlaid first physical location 224 and first virtual location 226 with one another, and then apply an equation or formula (e.g., law of cosines, law of sines, law of tangents) to determine the angle in which the virtual coordinate system 212 is to be rotated in order to align the first virtual location 226 with the first physical location 224 and to align the second virtual location 230 with the second physical location 228. Although the described method includes performing the calibration in a particular sequence (i.e., scaling, translating, and rotating), the steps of the calibration may be performed in any suitable order, such as translating then scaling then rotating, translating then rotating then scaling, or any other suitable sequence. In any case, after the virtual coordinate system 212 is calibrated to match the device coordinate system 214, the computing system 56 may associate various virtual locations of the virtual coordinate system 212 with corresponding physical locations of the device coordinate system 214. By way of example, the computing system 56 may determine that a third virtual location 246 is associated with a third physical location 248 based on the calibration.

In additional embodiments, a different manner of calibration may be performed to match the virtual coordinate system 212 with the device coordinate system 214. As an example, the computing system 56 may shorten the virtual coordinate system 212 along the first y-axis 216, shorten the virtual coordinate system 212 along the first x-axis 218, rotate the virtual coordinate system 212 in a direction opposite the rotational direction 244, or any combination thereof. Indeed, the computing system 56 may calibrate the virtual coordinate system 56 in any suitable manner to align selected virtual locations of the virtual coordinate system 212 with respective selected physical locations of the device coordinate system 214.

Figure 5:
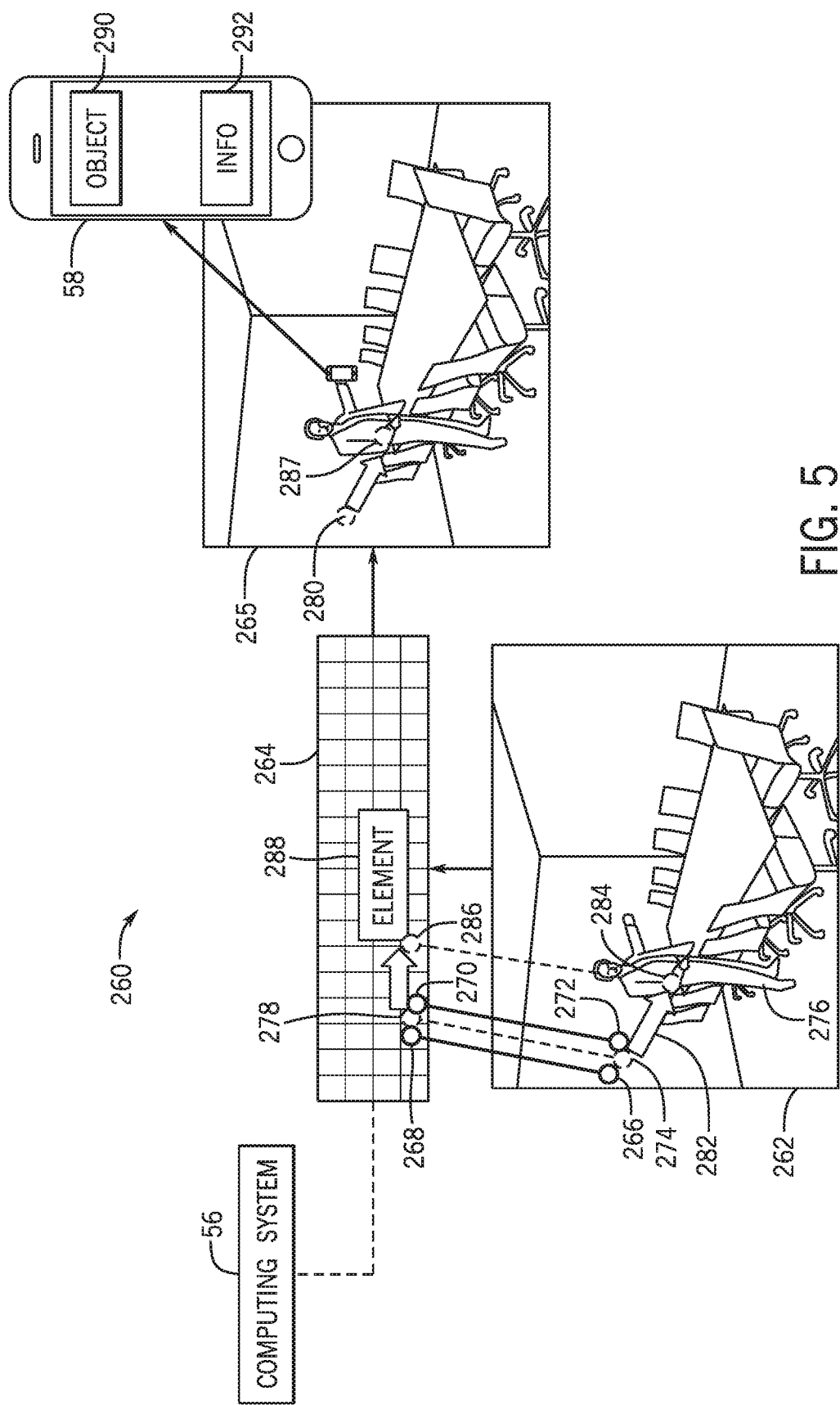
FIG. 5 is a schematic of an embodiment of a mapping arrangement in which elements are mapped into a virtual coordinate system representing a physical environment, in accordance with an embodiment of the present disclosure.

It may also be desirable for a user to receive certain information based a positioning of the user. For example, the user may be located within a physical environment, and it may be desirable to information regarding the physical environment based on the positioning of the user (e.g., relative to a feature of the physical environment). FIG. 5 further describes an embodiment in which features may be presented to a user based on the determined positioning of the user.

FIG. 5 is a schematic of an embodiment of a second mapping arrangement 260 illustrating how elements from a third physical environment 262 are mapped into a virtual coordinate system 264 representing a representative physical environment 265 (e.g., a mixed environment having physical features associated with the third physical environment 262 and additional virtual features). In the illustrated embodiment, a first physical location 266 is associated with a first virtual location 268, and a second physical location 270 is associated with a second virtual location 272. Accordingly, the computing system 56 determines that a first physical positioning 274 of a third user 276 in the third physical environment 262 is associated with a first virtual positioning 278 in the virtual coordinate system 264 and also with a first representative positioning 280 in the representative physical environment 265. Moreover, the computing system 56 monitors movement of the third user 276 in the third physical environment 262 to determine corresponding movement of the third user 276 in the virtual coordinate system 264 and in the representative physical environment 265. For instance, the computing system 56 may cause features, such as images of real-life objects, of the third physical environment 262 to be presented to the third user 276 based on the physical positioning of the third user 276 in the third physical environment 262.

In the illustrated embodiment, the third user 276 moves from the first physical positioning 274 in a direction 282 to a second physical positioning 284 in the third physical environment 262. Accordingly, the computing system 56 determines the third user 276 has moved in the virtual coordinate system 264 from the first virtual positioning 278 to a second virtual positioning 286 and has moved in the representative physical environment 265 from the first representative positioning 280 to a second representative positioning 287 in the representative physical environment 265.

In some embodiments, the virtual coordinate system 264 may include an element 288 that may be presented to the third user 276. In an example, the element 288 may include a feature positioned in a particular location in the virtual coordinate system 264 and in a corresponding location in the representative physical environment 265. As a result, the computing system 56 may present the element 288 (e.g., an image of an object 290) to the third user 276 based on the position of the element 288 relative to the virtual positioning of the third user 276 in the virtual coordinate system 264, such as to emulate the object 290 being positioned within the third physical environment 262.

In another example, geofencing may be used to determine whether certain features are presented to the third user 276 based on the determined virtual positioning of the third user 276. To this end, the element 288 may include a trigger area encompassing multiple virtual positionings in the virtual coordinate system 264, and the computing system 56 may determine whether the third user 276 is in a virtual positioning encompassed by the trigger area. For instance, in response to determining the third user 276 has moved to a virtual positioning within the trigger area based on the positioning of the third user 276 in the third physical environment 262, the computing system 56 may output a signal to the mobile device 58 of the third user 276. In the illustrated embodiment, the signal causes the mobile device 58 to display or present information 292. As such, the third user 276 may view the information 292 via the mobile device 58 when the mobile device 58 is physically located at a position that corresponds to the virtual positionings encompassed by the trigger area. In additional embodiments, the signal may cause the mobile device 58 to generate a haptic notification (e.g., a vibration), an audio output, another suitable feature, or any combination thereof. However, if the computing system 56 determines that the third user 276 is not within one of the virtual positionings encompassed within the trigger area, the computing system 56 may not send the signal to cause the mobile device 58 to present the features. Thus, the third user 276 may not be able to experience the features (e.g., view the information 292) positioned outside of the trigger area. In this way, the computing system 56 may use the virtual coordinate system 264 to cause or not cause mobile device to present features to the third user 276 based on the determined positioning of the third user 276 in the third physical environment 262.

The illustrated second mapping arrangement 260 may also enable the computing system 56 to facilitate navigation of the third user 276 in the physical environment 262. By way of example, based on the mapping of the representative physical environment 265 with the virtual coordinate system 264, the computing system 56 may determine the virtual positionings of various features of the physical environment 262 within the virtual coordinate system 264. For instance, the third user 276 may indicate (e.g., via the mobile device 58) a request to navigate into a particular room, such as a break room of the physical environment 262. The computing system 56 may determine a virtual positioning of the break room within the virtual coordinate system 264 and may compare the virtual positioning of the break room with the virtual positioning of the third user 276. Based on the comparison, the computing system 56 may then present instructions to the third user 276 regarding how to navigate to the break room. As an example, the computing system 56 may cause the mobile device 58 to present audio output (e.g., voice instructions), visual output (e.g., a display of a directional arrow), and the like, to guide the third user 276 through the physical environment 262. Such instructions may generally try to match the virtual positioning of the third user 276 with the virtual positioning of the break room in order to direct the third user 276 toward the break room or any other feature of interest in the physical environment.

In some circumstances, different users may desire map into different representative environments to interact with other users within the different representative environments. For instance, one of the users may desire to map into a first virtual environment, another of the users may desire to map into a second virtual environment, and yet another of the users may desire to map into a physical environment.

Figure 6:
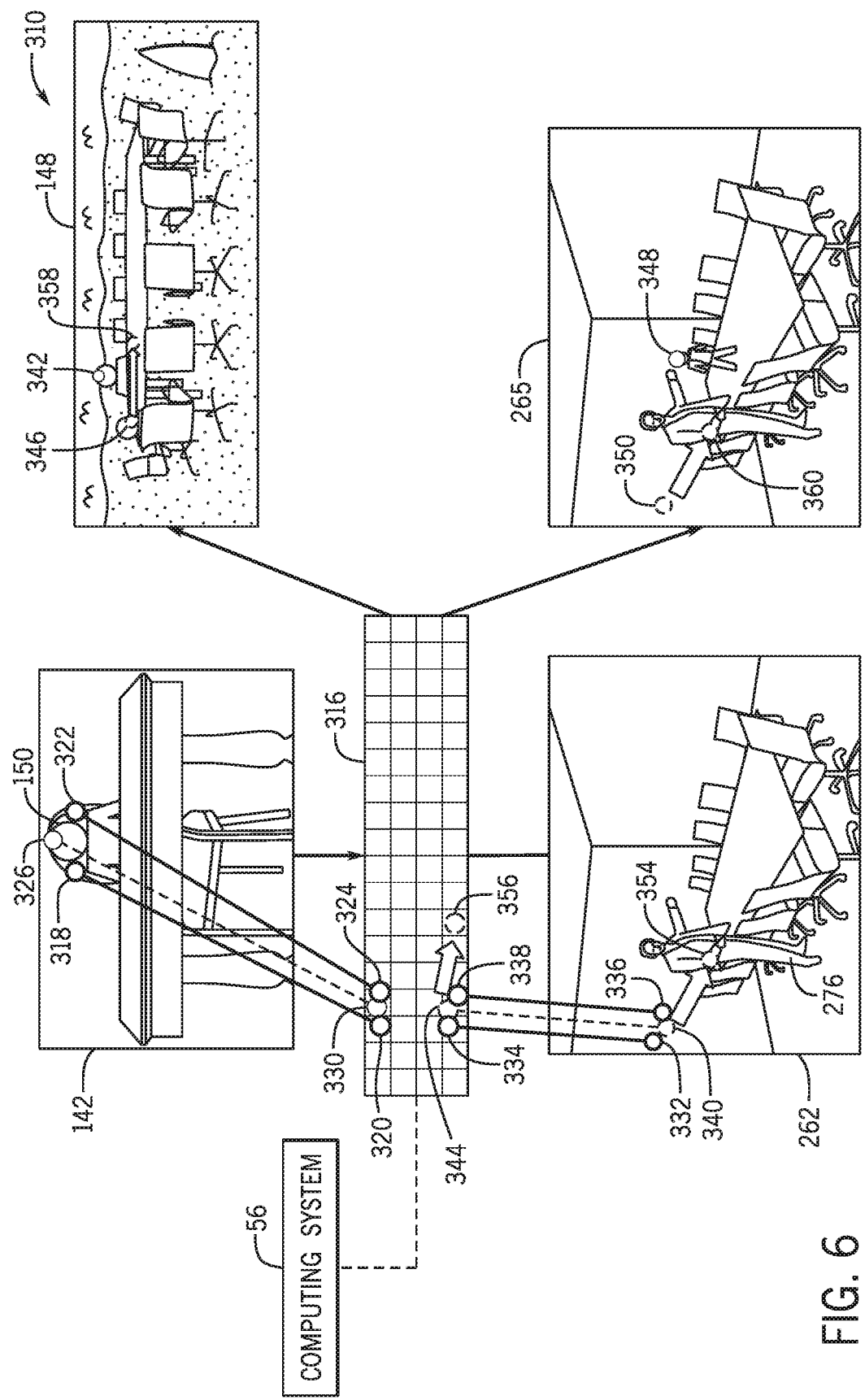
FIG. 6 is a schematic of an embodiment of a mapping arrangement in which elements are mapped into a virtual coordinate system representing both a virtual environment and a physical environment, in accordance with an embodiment of the present disclosure.

FIG. 6 is a schematic of an embodiment of a third mapping arrangement 310 illustrating how elements from the first physical environment 142 and from the third physical environment 262 are mapped into a virtual coordinate system 316 representing both the virtual environment 148 and the representative physical environment 265. For instance, the computing system 56 maps the first user 150 into the virtual coordinate system 316 based on an association between a first physical location 318 of the first physical environment 142 and a first virtual location 320 in the virtual coordinate system 316, and an association between a second physical location 322 of the first physical environment 142 and a second virtual location 324 in the virtual coordinate system 316. As a result, the computing system 56 determines that a first physical positioning 326 of the first user 150 in the first physical environment 142 is associated with a first virtual positioning 330 in the virtual coordinate system 316. Similarly, the computing system 56 maps the third user 276 into the virtual coordinate system 316 based on an association between a third physical location 332 of the third physical environment 262 and a third virtual location 334 in the virtual coordinate system 316, as well as an association between a fourth physical location 336 of the third physical environment 262 and a fourth virtual location 338 in the virtual coordinate system 316. Accordingly, the computing system 56 determines that a second physical positioning 340 of the third user 276 in the third physical environment 262 is associated with a second virtual positioning 344 in the virtual coordinate system 316.

In the illustrated embodiment, the computing system 56 determines that the first virtual positioning 330 associated with the first user 150 corresponds to a first representative positioning 342 of the first user 150 in the virtual environment 148, and the second virtual positioning 344 associated with the third user 276 corresponds to a second representative positioning 346 of the third user 276 in the virtual environment 148. Similarly, the computing system 56 determines that the first virtual positioning 330 associated with the first user 150 corresponds to a third representative positioning 348 of the first user 150 in the representative physical environment 265, and the second virtual positioning 344 associated with the third user 276 corresponds to a fourth representative positioning 350 of the third user 276 in the representative physical environment 265. Additionally, the third user 276 may move from the second physical positioning 340 to a third physical positioning 354 in the third physical environment 262. The computing system 56 may determine that the third physical positioning 354 is associated with a third virtual positioning 356 in the virtual coordinate system 316. The third virtual positioning 356 in the virtual coordinate system 316 may be associated with a fifth representative positioning 358 of the third user 276 in the virtual environment 148 and a sixth representative positioning 360 of the third user 276 in the representative physical environment 265.

In some embodiments, the computing system 56 may present features of the virtual environment 148 to the first user 150. As such, similar to the description with reference to FIG. 3, the computing system 56 may present features to the first user 150 to emulate the first user 150 being in the first representative positioning 342 in the virtual environment 148. Accordingly, the computing system 56 may present an image of the third user 276 to the first user 150 based on the second virtual positioning 344 of the first user 150 relative to the first virtual positioning 330 of the third user 276. Additionally, the computing system 56 may present features associated with the representative physical environment 265 to the third user 276. For example, the computing system 56 may cause the mobile device 58 of the third user 276 to present certain features, such as images, information, sounds, haptic feedback, and so forth, based on the determined positioning of the third user 276 in the virtual coordinate system 316 (e.g., relative to a trigger area in the virtual coordinate system 316). Furthermore, the computing system 56 may present an image of the first user 150 to the third user 276 based on the first virtual positioning 330 of the first user 150 relative to the second virtual positioning 344 of the third user 276 in the virtual coordinate system 316. By way of example, the computing system 56 may cause the image of the first user 150 to be presented relative to the real-life objects of the third physical environment 262 (e.g., overlaid onto images of the real-life objects of the third physical environment 262) to emulate that the first user 150 is positioned within the third physical environment 262. When the computing system 56 determines the third user 276 has moved from the second virtual positioning 344 to the third virtual positioning 356 in the virtual coordinate system 316, the computing system 56 may update the image of the first user 150 based on the movement of the third user 276 within the virtual coordinate system 316 and/or based on a relationship between the third virtual positioning 356 of the third user 276 and the first virtual positioning 330 of the first user 150. For instance, the computing system 56 may anchor or fix the image of the first user 150 in the third physical environment 262. In this manner, when the third user 276 moves from the second physical positioning 340 to the third physical positioning 354 within the third physical environment 262, the computing system 56 may update the image of the first user 150 to emulate that the first user 150 remains in the same positioning in the third physical environment 262.

In additional embodiments, the computing system 56 may present features of the third physical environment 262 to the first user 150 to emulate the first user 150 being in the third representative positioning 348 in the representative physical environment 265. That is, the computing system 56 may present features of the third physical environment 262 to emulate the first user 150 being in the third physical environment 262. Moreover, the computing system 56 may present features of the virtual environment 148 to the third user 276 to emulate the third user 276 being in the virtual environment 148. Indeed, the computing system 56 may present features associated with any suitable representative environment to the first user 150 and/or to the third user 276. To this end, for example, the users 150, 276 may be able to select from which respective, representative environment (e.g., the virtual environment 148, the representative physical environment 265) features will be presented.

In some instances, a user may desire to map certain elements for viewing by an additional user without being mapped into a representative environment. By way of example, the user may be in contact for assisting the additional user with performing a task and therefore may desire to provide certain information or features to be presented to the additional user. However, the user may merely be briefly in contact with the additional user and therefore may not desire to be mapped into the representative environment presented to the other user.

Figure 7:
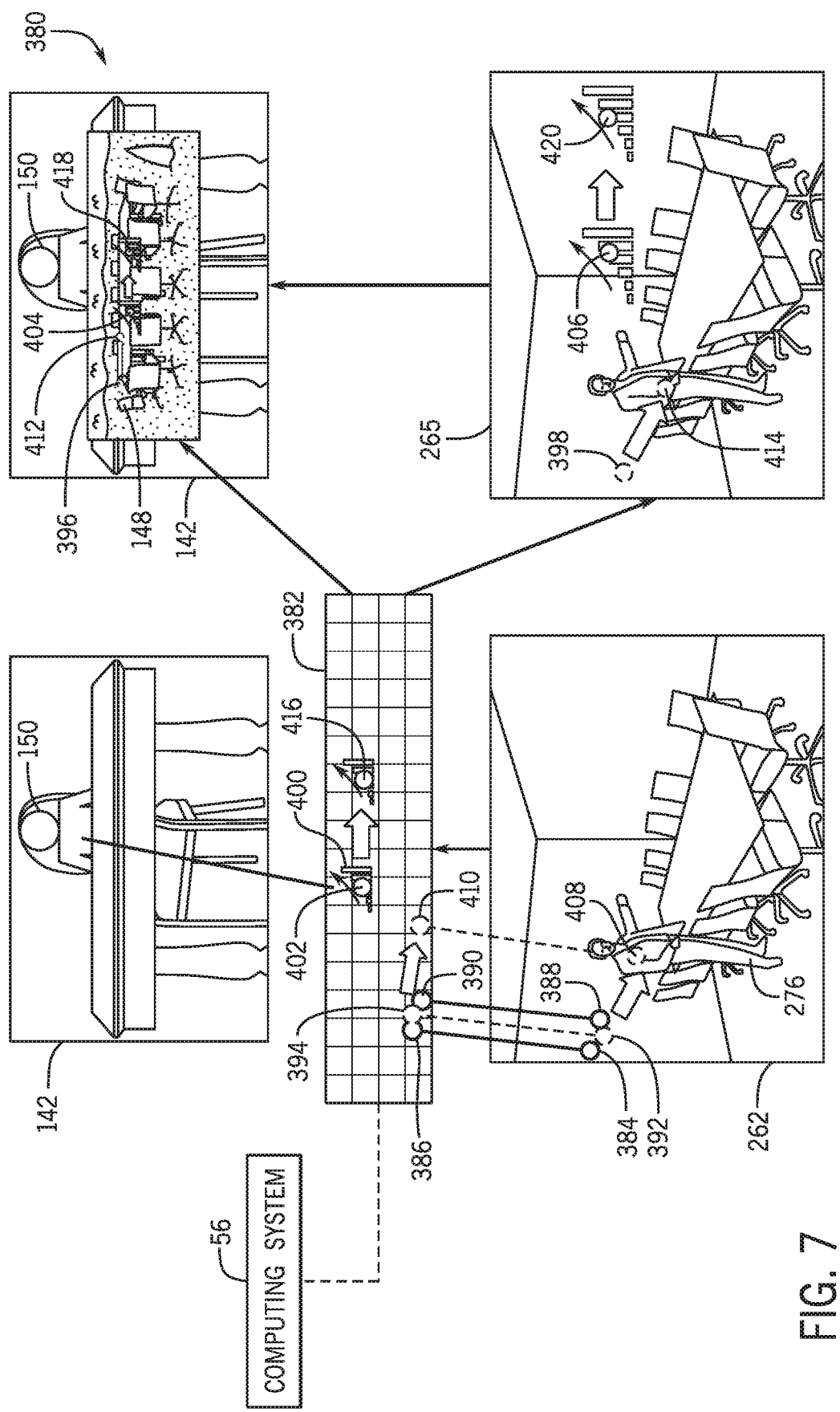
FIG. 7 is a schematic of an embodiment of a mapping arrangement in which elements are mapped into a virtual coordinate system representing both a virtual environment and a physical environment, in accordance with an embodiment of the present disclosure.

With the preceding in mind, FIG. 7 is a schematic of an embodiment of a fourth mapping arrangement 380 illustrating how additional elements are mapped into a virtual coordinate system 382 representing both the virtual environment 148 and the representative physical environment 265. In the illustrated embodiment, the virtual environment 148 may be presented as an image to the first user 150. That is, instead of presenting the features of the virtual environment 148 around the first user 150 to emulate the first user 150 being immersed in the virtual environment 148, the features of the virtual environment may be presented as a single image or a series of images (e.g., a video) via the mobile device 58 to the first user 150. In this way, the features of the virtual environment 148 are presented separately from, rather than augmented to, the real-life objects of the first physical environment 142. Although the computing system 56 presents features of the virtual environment 148 to the first user 150 in the illustrated embodiment, in additional embodiments, the computing system 56 may present any suitable representative environment (e.g., the representative physical environment 265) to the first user 150.

As illustrated in FIG. 7, the computing system 56 maps the third user 276 into the virtual coordinate system 382 by associating a first physical location 384 of the third physical environment 262 with a first virtual location 386 in the virtual coordinate system 382, and associating a second physical location 388 with a second virtual location 390 in the virtual coordinate system 382. Accordingly, the computing system 56 determines that a first physical positioning 392 of the third user 276 in the third physical environment 262 is associated with a first virtual positioning 394 in the virtual coordinate system 382. The first virtual positioning 394 may be associated with a first representative positioning 396 of the third user 276 in the virtual environment 148 that is presented to the first user 150 and may also be associated with a second representative positioning 398 of the third user 276 in the representative physical environment 265. Thus, the computing system 56 may present the virtual environment 148 and the third user 276 positioned within the virtual environment 148 to the first user 150 based on the first representative positioning 396 of the third user 276 in the virtual environment 148. Moreover, the computing system 56 may cause features associated with the representative physical environment 265 to be presented to the third user 276 based on the determined positioning of the third user 276 in the representative physical environment 265.

In addition, the first user 150 in the first physical environment 142 may be able to add features or elements into the virtual coordinate system 382 (e.g., via the mobile device 58). In the illustrated embodiment, the first user 150 places a graph 400 into the virtual coordinate system 382 at a second virtual positioning 402. In some embodiments, the graph 400 may be presented based on the second virtual positioning 402 of the graph 400 in the virtual coordinate system 382. For instance, the computing system 56 may determine a third representative positioning 404 of the graph 400 in the virtual environment 148 based on the second virtual positioning 402 of the graph 400 in the virtual coordinate system 382. Accordingly, the computing system 56 may present an image of the graph 400 positioned within the virtual environment 148 (e.g., relative to the third user 276) to the first user 150 based on the second virtual positioning 402. Moreover, the computing system 56 may determine a fourth representative positioning 406 of the graph 400 in the representative physical environment 265 based on the second virtual positioning 402 of the graph 400 in the virtual coordinate system 382. Accordingly, the computing system 56 may present an image of the graph 400 to the third user 276 based on the second virtual positioning 402 of the graph 400 relative to the first virtual positioning 394 of the third user 276 in the virtual coordinate system 382. For instance, the computing system 56 may present an image of the graph 400 relative to the real-life objects of the third physical environment 262 to emulate that the graph 400 is a physical object positioned within the third physical environment 262.

Moreover, the third user 276 may change from the first physical positioning 392 to a second physical positioning 408 within the third physical environment 262, and the second physical positioning 408 may be associated with a third virtual positioning 410 in the virtual coordinate system 382. In addition, the third virtual positioning 410 is associated with a fifth representative positioning 412 in the virtual environment 148 and with a sixth representative positioning 414 in the representative physical environment 265. In this way, the computing system 56 may update the image of the virtual environment 148 presented to the first user 150 to show that the third user 276 has moved from the first representative positioning 396 to the fifth representative positioning 412. Moreover, the computing system 56 may update the features of the representative physical environment 265 presented to the third user 276, such as by updating the image of the graph 400 in the fourth representative positioning 406 (e.g., to anchor or fix the image of the graph 400 in the third physical environment 262).

Further still, the virtual positioning of the graph 400 may be adjustable within the virtual coordinate system 382. As an example, the first user 150 may move the graph 400 (e.g., via the mobile device 58) from the second virtual positioning 402 to a fourth virtual positioning 416. The fourth virtual positioning 416 may correspond to a fifth representative positioning 418 of the graph 400 in the virtual environment 148. In this way, moving the graph 400 to the fourth virtual positioning 416 may cause the computing system 56 to update the image of the virtual environment 148 presented to the first user 150 to show that the graph 400 is in the fifth representative positioning 418. Additionally, the fourth virtual positioning 416 may correspond to a sixth representative positioning 420 of the graph 400 in the representative physical environment 265. Accordingly, moving the graph 400 to the fourth virtual positioning 416 may cause the computing system 56 to update the image of the graph 400 presented to the third user 276 (e.g., to illustrate the graph 400 is in a new location within the representative physical environment 265). In additional embodiments, the graph 400 may be adjustable by the third user 276 (e.g., via another respective mobile device 58), and the computing system 56 may update the images presented to the first user 150 and/or to the third user 276 accordingly. For instance, the third user 276 may adjust the orientation and/or a dimensioning (e.g., a focus, a zoom) of the graph 400 such that the third user 276 may view a particular portion of the graph 400 more clearly. In further embodiments, in addition to the graph, another element (e.g., a trigger area described above) may be placed in the virtual coordinate system 382 to cause features to be presented based on a determined virtual positioning of the third user 276 in the virtual coordinate system 382. Indeed, any suitable element or feature may be positioned within the virtual coordinate system 382 and to a representative environment accordingly.

As described above, the physical positioning of each user may be continuously monitored even if the user is not within a particular physical environment associated with the virtual coordinate system. Moreover, the physical positioning of each user may also be continuously monitored even while the user is not mapped into the virtual coordinate system. For instance, the user may desire to map into the virtual coordinate system at a first time (e.g., a first workday) to view certain features associated with particular physical positionings. At a second time (e.g., a day off), the user may desire to map out of the virtual coordinate system to avoid viewing such features. At a third time (e.g., a second workday), the user may desire to map back into the virtual coordinate system so as to view the same features associated with the same physical positionings. That is, when the user maps back into the virtual coordinate system, the virtual features may be viewable at the originally positioned physical locations.

Figure 8:
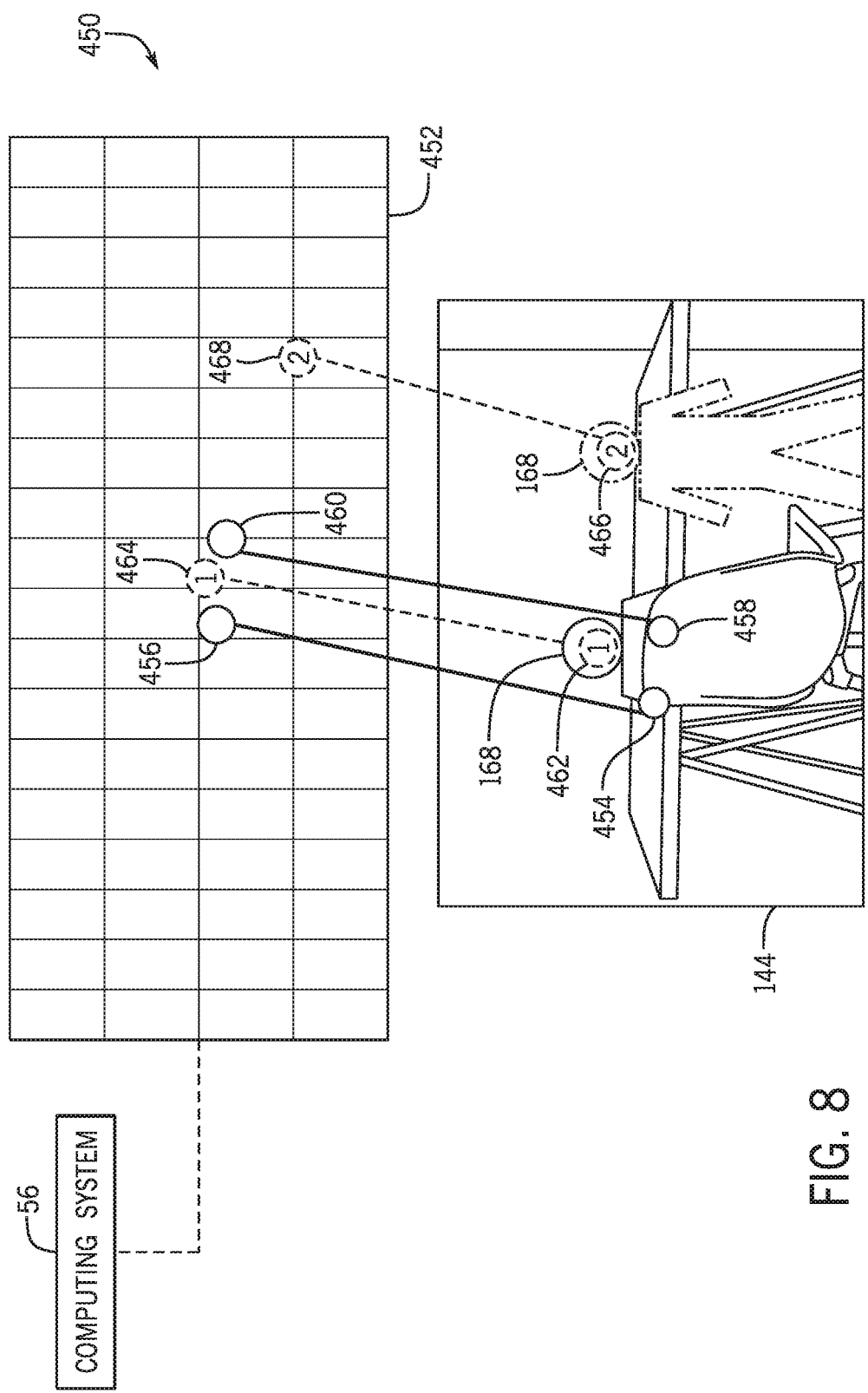
FIG. 8 is a schematic of an embodiment of a mapping arrangement in which a user is mapped into a virtual coordinate system at different times, in accordance with an embodiment of the present disclosure.

With this in mind, FIG. 8 is a schematic of an embodiment of a fifth mapping arrangement 450 illustrating the second user 168 mapping into a virtual coordinate system 452 from the second physical environment 144 at different times. In the illustrated embodiment, the computing system 56 may determine a starting position of the second user 168 within the virtual coordinate system 452 based on an association between a first physical location 454 of the second physical environment 144 and a first virtual location 456 in the virtual coordinate system 452 and based on an association between a second physical location 458 of the second physical environment 144 and a second virtual location 460 in the virtual coordinate system 452. As a result, the computing system 56 may determine that a first physical positioning 462 of the second user 168 (e.g., at a first time) in the second physical environment 144 is associated with a first virtual positioning 464 in the virtual coordinate system 452, thereby mapping the second user 168 into the virtual coordinate system 452. At any time after mapping into the virtual coordinate system 452, the second user 168 may map out of the virtual coordinate system 452. By mapping out of the virtual coordinate system 452, the computing system 56 does not determine a positioning of the second user 168 within the virtual coordinate system 452 and therefore does not present features to the second user 168 based on the positioning of the second user 168 within the virtual coordinate system 452.

However, even though the second user 168 has mapped out of the virtual coordinate system 452, the computing system 56 may continue to track (e.g., via the dead reckoning techniques) movement of the second user 168, such as movement deviating from the first physical positioning 462. By way of example, at a second time, the computing system 56 may determine that the second user 168 is at a second physical positioning 466 within the second physical environment 144. The second user 168 may map back into the virtual coordinate system 452 while at the second physical positioning 466. The computing system 56 may determine a relationship between the second physical positioning 466 and the first virtual positioning 464 to determine a corresponding second virtual positioning 468 in the virtual coordinate system 452 associated with the second physical positioning 466. That is, the relationship (e.g., distance, angle, placement) between the first physical positioning 462 and the second physical positioning 466 corresponds to (e.g., is substantially the same as, is proportional to) the relationship between the first virtual positioning 464 and the second virtual positioning 468. Therefore, the computing system 56 may determine a corresponding position of the second user 168 in the virtual coordinate system 452 by tracking movement of the second user 168 in the second physical environment 144, even though the computing system 56 did not continuously track movement of the second user 168 in the virtual coordinate system 452. In this way, so long as the computing system 56 is able to track the physical positioning of the second user 168 relative to the first physical positioning 462, the computing system 56 may be able to map the second user 168 into the virtual coordinate system 452 accordingly.

In additional embodiments, the second user 168 may be able to manually select or change their current physical positioning in order to map to a desirable virtual positioning within the virtual coordinate system 452. That is, for example, the second user 168 may utilize the mobile device 58 to change their physical positioning (e.g., as determined by the computing system 56) without moving from the current physical positioning. As a result, the computing system 56 may determine the virtual positioning of the second user 168 in the virtual coordinate system 452 has changed even though the second user 168 has not moved from the current physical positioning. For instance, the second user 168 may desire to move to a particular positioning of a representative environment associated with the virtual coordinate system 452 without having to move to a corresponding positioning of the second physical environment 144. Thus, the second user 168 may indicate movement to the corresponding positioning of the second physical environment 144 via the mobile device 58 without actually moving to be at the corresponding positioning.

It may be desirable to associate physical locations with virtual locations using other methods without having to manually select and associate such locations. For this reason, the computing system 56 may automatically determine a virtual positioning of the user (e.g., the user 52) without the user having to manually select physical locations. For instance, the user may merely use the mobile device 58 to indicate the desire to map into the virtual coordinate system, and the computing system 56 may automatically determine the positioning of the user in the virtual coordinate system in response. As such, the user may map into the virtual coordinate system more easily (e.g., without having to provide as much user input). FIGS. 9-13 provide additional details regarding various other possible mapping methods. As an example, instead of using physical locations selected by the user, each mapping method may use pre-positioned, preselected, or otherwise predetermined markers positioned in a physical environment for associating a physical positioning with a virtual positioning in the virtual coordinate system. In this manner, the virtual coordinate system may be already be calibrated to match the physical environment, and the computing system 56 may determine a virtual positioning of the user in the virtual coordinate system based on the calibration and the physical positioning of the user in the physical environment. Any of the mapping methods described herein may be used to map users into any suitable virtual coordinate system, such as any of the virtual coordinate system described above. In some embodiments, the user may use a respective mapping method to map into the respective virtual coordinate systems. That is, each virtual coordinate system is associated with a particular mapping method for mapping into the respective virtual coordinate systems. In additional embodiments, the user may use any of the mapping methods to map into one of the virtual coordinate system.

In one situation, a physical environment may be pre-set with physical features (e.g., objects) that are used for determining the positioning of a user in a virtual coordinate system. For example, the physical features may include sensors configured to determine the location of the user within the physical environment (e.g., relative to the sensors).

Figure 9:
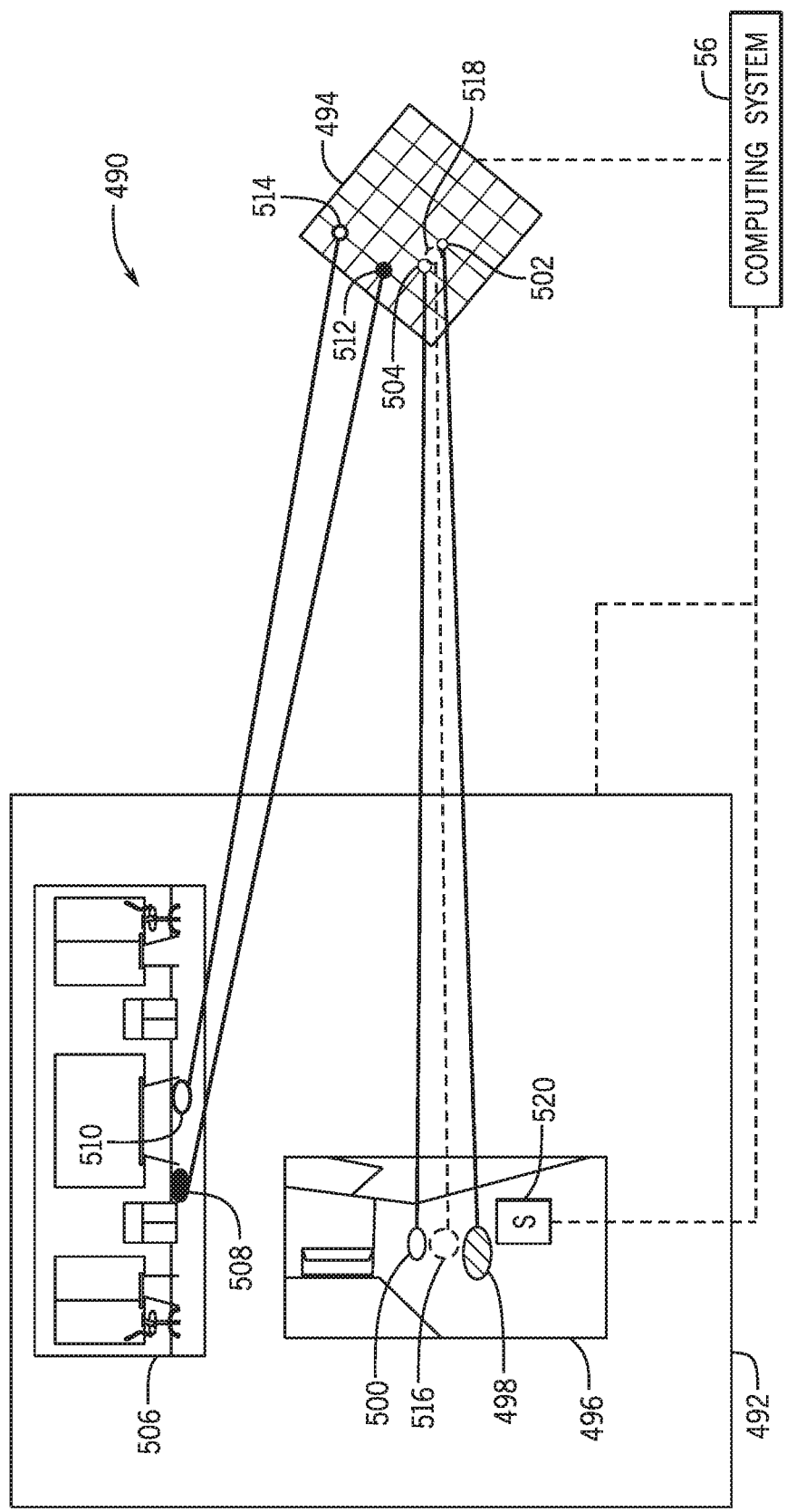
FIG. 9 is a diagram of an embodiment of a mapping method for mapping a user from a physical environment into a virtual coordinate system using multiple markers in the physical environment, in accordance with an embodiment of the present disclosure.

With the preceding in mind, FIG. 9 is a diagram of an embodiment of a mapping method 490 for mapping the user 52 from a physical environment 492 into a virtual coordinate system 494. The illustrated physical environment 492 has a first area 496 that includes a first physical marker 498 (e.g., a first object or sensor disposed in the physical environment 492) and a second physical marker 500 (e.g., a second object or sensor disposed in the physical environment 492). The first physical marker 498 is associated with a first virtual location 502, and the second physical marker 500 is associated with a second virtual location 504. Moreover, the physical environment 492 has a second area 506 that includes a third physical marker 508 and a fourth physical marker 510. The third physical marker 508 is associated with a third virtual location 512 and the fourth physical marker 510 is associated with a fourth virtual location 514. In certain embodiments, the computing system 56 may determine physical positionings of users in the first area 496 by using the first physical marker 498 and the second physical marker 500, and the computing system 56 may determine physical positionings of users in the second area 506 separately by using the third physical marker 508 and the fourth physical marker 510. Accordingly, the computing system 56 may determine a physical positioning 516 of the user 52 in the first area 496 relative to the physical markers 498, 500 and, based on the determined physical positioning 516 of the user 52, the computing system 56 may determine an associated virtual positioning 518 of the user 52 in the virtual coordinate system 494. For instance, similar to determining the virtual positioning of the users via selected physical positions, the computing system 56 may determine a distance, position, orientation, and so forth, between the physical positioning 516 and the physical markers 498, 500 to determine the virtual positioning 518 having similar relationships with the virtual locations 502, 504.

In certain embodiments, the computing system 56 may determine the physical positioning 516 of the user 52 via a sensor 520. For instance, the sensor 520 may be an optical sensor (e.g., a camera, a proximity sensor) that may detect a distance of the user 52 relative to the physical markers 498, 500, 508, 510, a force or pressure sensor that may detect contact between the user 52 and one of the physical markers 498, 500, 508, 510, or any other suitable sensor that may determine the physical positioning 516 of the user 52 relative to the physical markers 498, 500, 508, 510. In additional embodiments, the computing system 56 may determine the physical positioning 516 of the user 52 via user input. As an example, the user 52 may manually select (e.g., via the mobile device 58) the physical positioning 516 relative to the physical markers 498, 500, 508, 510, and the computing system 56 may use the manually selected physical positioning 516 to determine the corresponding virtual positioning 518 in the virtual coordinate system 494.

In another situation, the physical environment may have fewer physical features, but the positioning of the user relative the physical features may be determined based on a determined orientation of the user relative to the physical feature. For example, an office may merely have a single physical feature, but the position of the user within the office may be determined based on the distance between the user and the physical feature and the direction where the user is facing within the office.

Figure 10:
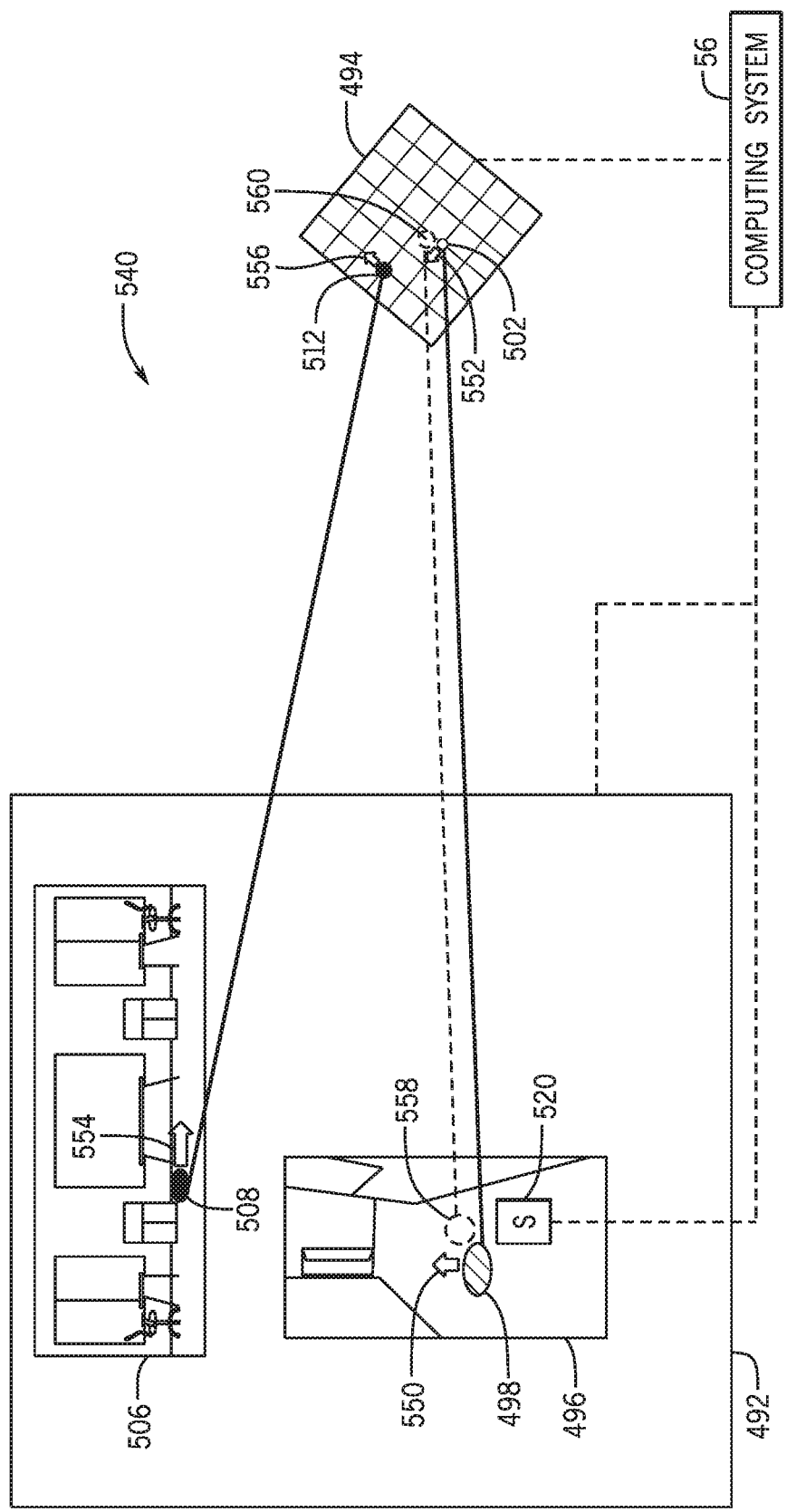
FIG. 10 is a diagram of an embodiment of a mapping method for mapping a user from a physical environment into a virtual coordinate system using a marker and a direction associated with the marker in the physical environment, in accordance with an embodiment of the present disclosure.

As an example, FIG. 10 is a diagram of an embodiment of a mapping method 540 for mapping the user 52 from the physical environment 492 into the virtual coordinate system 494 with the preceding technique. The first area 496 of this illustrated physical environment 492 has the first physical marker 498 associated with the first virtual location 502, and the second area 506 of the physical environment 492 has the third physical marker 508 associated with the third virtual location 512. However, the first area 496 and the second area 506 may not have the second physical marker 500 and the fourth physical marker 510, respectively, as described with respect to FIG. 9. Instead, the first physical marker 498 may be associated with a first physical direction 550, the first virtual location 502 may be associated with a corresponding first virtual direction 552, the third physical marker 508 may be associated with a second physical direction 554, and the second virtual location 504 may be associated with a corresponding second virtual direction 556.

The computing system 56 may acquire a physical positioning 558 of the user 52 via sensors or other suitable techniques described above and may determine the relationship between the physical positioning 558 of the user 52 and the first physical marker 498 and/or between the physical positioning 558 and the first physical direction 550 to determine a corresponding virtual positioning 560 of the user 52 in the virtual coordinate system 494. For example, the computing system 56 may determine a distance between the physical positioning 558 and the first physical marker 498 to determine a corresponding distance between the virtual positioning 560 and the first virtual location 502.

Moreover, the computing system 56 may determine a placement of the physical positioning 558 relative to the first physical marker 498 based on a relationship between the physical positioning 558 and the physical direction 550 (e.g., an angle between the physical direction 550 and the distance spanning between the first physical marker 498 and the physical positioning 558). The computing system 56 may then determine a corresponding placement of the virtual positioning 560 relative to the first virtual location 502 based on the relationship between the physical positioning 558 and the physical direction 550. For instance, a relationship between the virtual positioning 560 and the first virtual direction 552 (e.g., an angle between the first virtual direction 552 and the distance spanning between the first virtual location 502 and the virtual positioning 560) may correspond to the relationship between the physical positioning 558 and the physical direction 550. The computing system 56 may also determine an orientation of the physical positioning 558 relative to the first physical direction 550 to determine a corresponding orientation of the virtual positioning 560 relative to the first virtual direction 552. In an example, the first physical marker 498 may include a feature, such as a quick response code, a scanner, and the like, configured to receive an input from the mobile device 58 at a particular orientation of the mobile device 58, and therefore of the user, relative to the first physical marker 498. In another example, the sensor 520 may determine a weight distribution imparted by the user 52, and the computing system 56 may receive data indicative of the weight distribution in order to determine the orientation of the user 52 relative to the first physical direction 550. In yet another example, the sensor 520 may be an optical sensor that may capture an image of the user 52, and the computing system 56 may receive the captured image so as to determine the orientation of the user 52 relative to the first physical direction 550. In any case, the computing system 56 may determine the position and orientation of the physical positioning 558 relative to the first physical marker 498 and the first physical direction 550 to determine the position and orientation of the virtual positioning 560 relative to the first virtual location 502 and the first virtual direction 552.

In a similar situation, a compass may be used to determine a location of the user relative to the physical feature (e.g., with reference to cardinal directions). For instance, an office and therefore a physical feature of the office may be oriented with respect to north, east, south, and west cardinal directions. Thus, the position of the user may be determined based on the relationship between the user and the physical feature using the cardinal directions.

Figure 11:
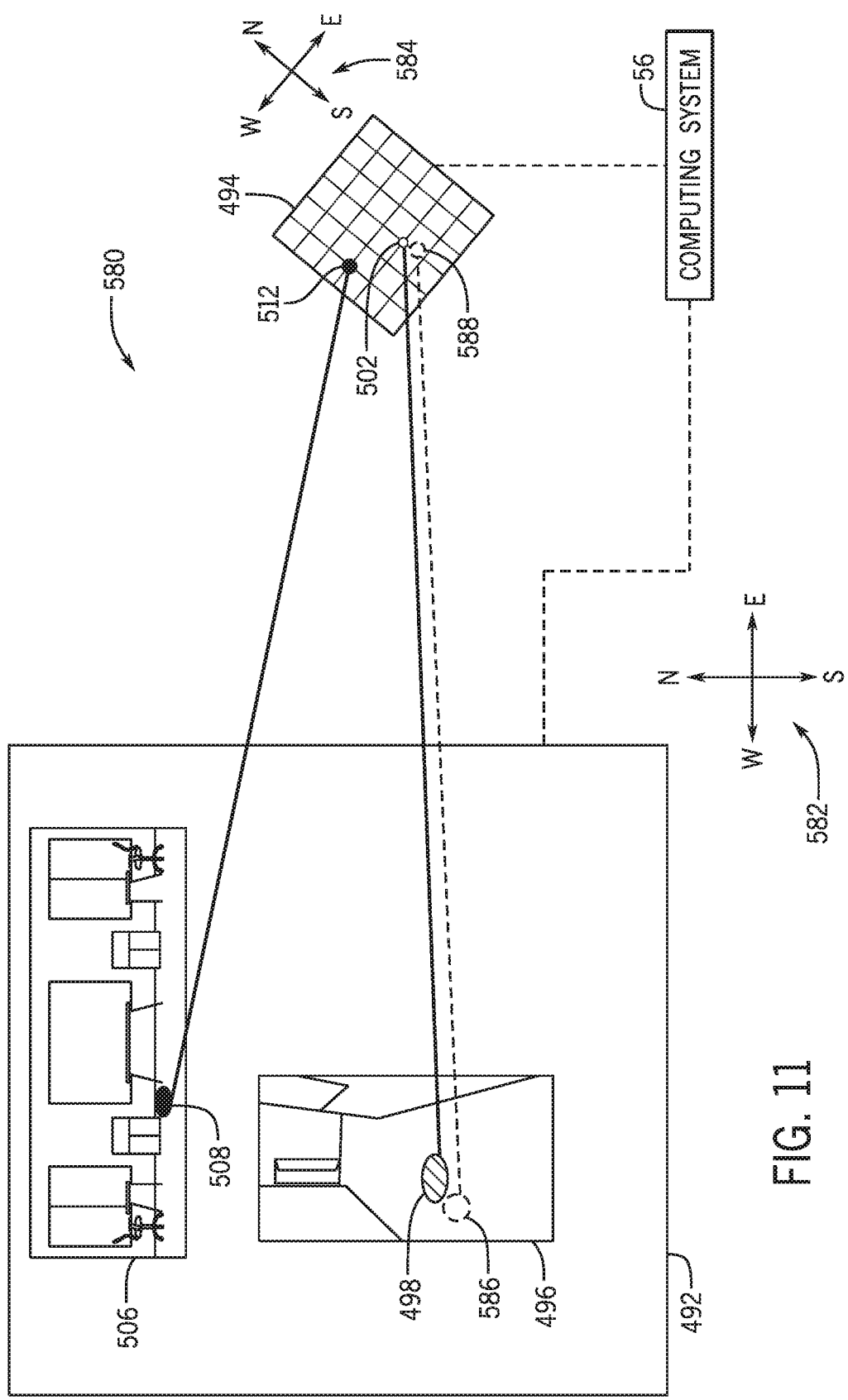
FIG. 11 is a diagram of an embodiment of a mapping method for mapping a user from a physical environment into a virtual coordinate system using a marker in the physical environment and a compass associated with the physical environment, in accordance with an embodiment of the present disclosure.

FIG. 11 is a diagram of an embodiment of a mapping method 540 for mapping the user 52 from the physical environment 492 into the virtual coordinate system 494. As illustrated in FIG. 11, the first area 496 has the first physical marker 498 associated with the first virtual location 502, and the second area 506 has the third physical marker 508 associated with the third virtual location 512. Moreover, instead of the additional physical markers 510, 500 or the additional physical directions 550, 554, the physical environment 492 is associated with a physical compass 582. The virtual coordinate system 494 is also associated with a respective virtual compass 584 and does not include the additional virtual locations 504, 514 or the virtual directions 552, 556. The respective compasses 582, 584 may provide directional navigation for the physical environment 492 and for the virtual coordinate system 494. For instance, the user 52 may be at a physical positioning 586 in the physical environment 492. The computing system 56 may determine the location and orientation of the physical positioning 586 relative to the first physical marker 498 by using the physical compass 582. Accordingly, by using the virtual compass 584, the computing system 56 may determine a corresponding virtual positioning 588 associated with the physical positioning 586 based on the relationship between the physical positioning 586 relative to the first physical marker 498. As such, the computing system 56 is able to use cardinal directions of the physical environment 492 with corresponding cardinal directions of the virtual coordinate system 494 for associating physical positionings in the physical environment 492 with virtual positionings in the virtual coordinate system 494.

It should also be noted that the techniques described with respect to FIGS. 10 and 11 may be applied to user-selected locations described above with respect to FIGS. 3-8. That is, physical and virtual directions may be applied to user-selected physical and virtual locations, respectively, and/or the compasses 582, 584 may be used with the user-selected physical and virtual locations. Indeed, user-selected locations and predetermined physical markers may be used together for mapping the user 52 into the virtual coordinate system 494.

In a further situation, the user may be mapped to the same positioning the virtual coordinate system. For example, at an office, rather than determining the positioning of the user within the office to determine the corresponding positioning of the user within the virtual coordinate system, each positioning within the office may be associated with the same initial positioning within the virtual coordinate system.

Figure 12:
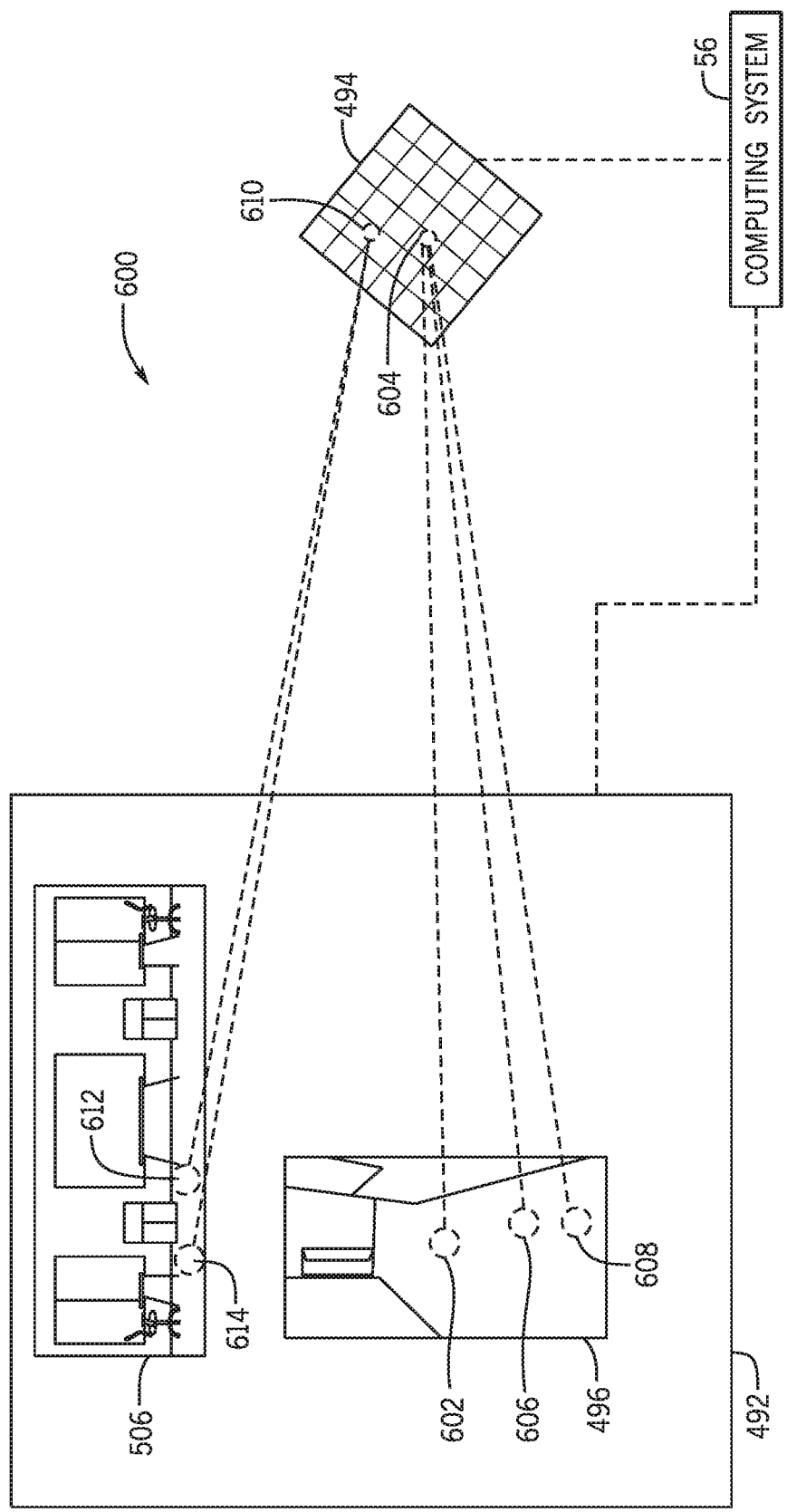
FIG. 12 is a diagram of an embodiment of a mapping method for mapping a user from a physical environment into a virtual coordinate system using a default virtual positioning in the virtual coordinate system, in accordance with an embodiment of the present disclosure.

FIG. 12 is a diagram of an embodiment of a mapping method 600 for mapping the user 52 from the physical environment 492 into the virtual coordinate system 494. For the mapping method 600, different physical positionings in the physical environment 492 may map to the same virtual positioning or substantially the same virtual positioning (e.g., within a distance range of one another) in the virtual coordinate system 494. In certain embodiments, physical positionings in the respective areas 496, 506 may map into a different virtual positioning in the virtual coordinate system 494. In the illustrated embodiment, a first physical positioning 602 (e.g., of a first user) in the first area 496 may map into a first virtual positioning 604 in the virtual coordinate system 494. Moreover, a second physical positioning 606 (e.g., of a second user), which is different than the first physical positioning 602, may map into substantially the same first virtual positioning 604. Further still, a third physical positioning 608 (e.g., of a third user), which is different from the first physical positioning 602 and from the second physical positioning 606, may also map into substantially the same first virtual positioning 604. In this way, rather than determining a particular relationship of the physical positionings in the physical environment 492 and determining an associated virtual positioning in the virtual coordinate system 494 based on the determined relationship, the computing system 56 may map each physical positioning to the same (e.g., a default) virtual positioning in the virtual coordinate system 494.

Furthermore, physical positionings in the second area 506 may map into a second virtual positioning 610 in the virtual coordinate system 494. The second virtual positioning 610 may be different than the first virtual positioning 604. As illustrated in FIG. 12, a fourth physical positioning 612 (e.g., of a fourth user) may map into the second virtual positioning 610, and a fifth physical positioning 614 (e.g., of a fifth user) may also map into substantially the same second virtual positioning 610. In this manner, the computing system 56 may map the user 52 from the first area 496 to substantially the same first virtual positioning 604 and may map the user 52 from the second area 506 to substantially the same second virtual positioning 610. To this end, the computing system 56 may determine in which area the physical positioning of the user 52 is located and, based on the determined area of the user 52, the computing system 56 may map the user 52 into the virtual positioning associated with the area. As a result, there may be multiple default virtual positionings in the virtual coordinate system 494 to which the computing system 56 may map the user 52 based on the determined area in which the user 52 is physically located.

In certain implementations, the user 52 may be able to change the default virtual positioning (e.g., via the mobile device 58). As an example, the user 52 may move the first virtual positioning 604 in the virtual coordinate system 494 to an updated virtual positioning such that the computing system 56 may map the user 52 from the first area 496 to the updated virtual positioning instead of to the original first virtual positioning 604. Similarly, the user 52 may move the second virtual positioning 610 in the virtual coordinate system 494 to an additional updated virtual positioning such that the computing system 56 may map the user 52 from the first area 496 to the additional virtual positioning instead of to the original second virtual positioning 610. Moreover, the user 52 may add virtual positionings, such as to associate with additional areas in the physical environment 492 from which the user 52 may be mapped, and/or to remove virtual positionings, such as to map from different areas into the same virtual positioning. In this way, the user 52 may manually set the default virtual positioning to which the computing system 56 may map the user 52 from the physical environment 492.

In further implementations, there may be multiple predetermined or pre-set virtual positionings to which the user 52 may be mapped upon selection. That is, for example, the user 52 may choose to map to either the first virtual positioning 604 or the second virtual positioning 610 as desired. In some approaches, each virtual positioning may be associated with a specific physical location and, as such, a respective physical marker may be implemented to facilitate the user with selecting the appropriate virtual positioning based on the physical location of the user. As an example, a first physical marker may have a first identifier (e.g., color, a labeled number), and the computing system 56 may display the first virtual positioning 604 as having the same identifier as that of the first physical marker to indicate that the first virtual positioning 604 is associated with the first physical marker. As another example, a second physical marker at a different physical location than that of the first physical marker may have a second identifier, and the computing system 56 may display the second virtual positioning 610 as having the same identifier as that of the second physical marker to indicate that the second virtual positioning 610 is associated with the second physical marker. Thus, the user 52 may appropriately select the corresponding virtual positioning 604, 610 based on the associated identifier of any of the physical markers.

In yet another situation, certain objects or other physical properties of the physical environment may be used for determining the positioning of the user. For example, an office may have a door, a table, or a chair of which the computing system 56 pre-stores an image and associated with a corresponding virtual positioning in the virtual coordinate system. The computing system 56 may be able to determine the positioning of the user relative to the particular objects to therefore determine the positioning of the user relative to the corresponding virtual positioning in the virtual coordinate system.

FIG. 13 is a diagram of an embodiment of a mapping method 630 for mapping the user 52 from the physical environment 492 into the virtual coordinate system 494. With the mapping method 630, the computing system 56 may associate an image of a portion of the physical environment 492 with a particular virtual positioning, location, or orientation in the virtual coordinate system 494. By way of example, the computing system 56 may recognize a feature of the physical environment 492 and may associate the feature with a particular portion of the virtual coordinate system 494. In the illustrated embodiment, the user 52 may capture an image 632 (e.g., of a doorway in the first area 496), and the computing system 56 may determine that the image 632 is associated with a virtual location 634 in the virtual coordinate system 494. For example, the computing system 56 may use image recognition to compare properties of the image 632 (e.g., pixel color, dimension) with stored information (e.g., corresponding image properties) associated with the virtual location 634 to determine whether the image 632 is associated with the stored information. If the properties of the image 632 match with the stored information, the computing system 56 may determine that the image 632 matches with the virtual location 634. Moreover, the computing system 56 may determine a physical positioning 636 of the user 52 relative to the part of the physical environment 492 associated with the image 632 based on the properties of the image 632. For instance, based on the shape, size, orientation, and/or other suitable property of the captured image 632 the computing system 56 may determine a location and/or orientation of the user 52 and relative to the part of the physical environment 492 associated with the image 632. As a result, the computing system 56 may determine a corresponding virtual positioning 638 of the user 52 in the virtual coordinate system 494 relative to the virtual location 634 based on the determined relationship between the physical positioning 636 and the part of the physical environment 492 associated with the image 632.

In some embodiments, the user 52 may be able to add various images to which the computing system 56 may recognize and associate with a particular virtual positioning in the virtual coordinate system 494. For instance, the user 52 may capture another image in the physical environment 492, such as of an object in the second area 506, and may associate a location of the object with a particular virtual positioning in the virtual coordinate system 494. As such, the computing system 56 may be able to recognize subsequent images of the object, to determine a physical positioning of the user 52 relative to the object based on a captured image of the object, and to determine a corresponding virtual positioning of the user 52 based on the determined physical positioning of the user 52 relative to the object. In further embodiments, the user 52 may be able to modify stored images, such as by changing the virtual location in the virtual coordinate system 494 associated with the stored images. In this manner, the user 52 may change to which virtual location in the virtual coordinate system 494 the computing system 56 may compare in order to determine the corresponding virtual positioning of the user 52. Further still, the user 52 may modify the specific properties of the images, such as by capturing updated images to enable the computing system 56 to store more accurate images for recognizing captured images of objects and/or for determining the virtual positioning of the user 52. In any case, the user 52 may manually set properties of various images to set how the user 52 is mapped into the virtual coordinate system 494.

In addition to image recognition, other similar techniques may be utilized for mapping users into the virtual coordinate system 494 based on a physical feature. For instance, optical character recognition, a quick response code scan, an augmented reality marker scan, another suitable technique, or any combination thereof may be used. In any case, the process of identifying a physical marking and matching the identified physical marking with a corresponding stored virtual marking may enable the computing system 56 to determine the positioning of the user 52.

FIG. 14 is a flowchart of an embodiment of a method 660 for tracking movement of the user 52 in a virtual coordinate system. The method 660 may be used for tracking movement of the user 52 in any of the virtual coordinate systems described above with respect to FIGS. 3-13. In other words, the method 660 may be implemented with any of the techniques described with reference to FIGS. 3-13. For instance, the method 660 may be used to map the user into a representative environment (e.g., a residential home) from a physical environment (e.g., from an office). In some embodiments, the method 660 may be performed by the computing system 56, such as based on sensor data received from the mobile device 58, but the method 660 may be performed by any suitable component in additional embodiment. Furthermore, a different method than the method 660 may be performed in additional embodiments. For example, additional steps may be performed, and/or certain steps of the method 660 may be modified, removed, and/or performed in a different order than depicted in FIG. 14.

At block 662, data and/or input indicative of a physical positioning of the user 52 in a physical environment is received. In some embodiments, the physical positioning may be received with reference to physical locations in the physical environment as selected by the user 52 (e.g., via the techniques described with respect to FIGS. 3-8). In additional embodiments, the physical positioning may be received with reference to preselected features (e.g., via the techniques described with respect to FIGS. 9-13). In any case, the data may be transmitted via the mobile device 58. As an example, the user 52 may manually select when the mobile device 58 transmits the data. For instance, the mobile device 58 may include an application or program that, when initialized or executed as determined by the user 52, transmits a signal or user input to the computing system 56, and the signal may include the input data indicative of the physical positioning. Thus, the method 660 may be initialized by the user 52.

Based on the received input, a corresponding virtual positioning of the user 52 in the virtual coordinate system is determined, as indicated at block 664, thereby mapping the user 52 into the virtual coordinate system. The virtual positioning of the user 52 may be determined based on the relationship between the physical positioning of the user 52 relative to certain physical locations (e.g., selected physical locations and/or predetermined features). As an example, the location and/or orientation of the physical positioning relative to one or more physical locations is determined, in which the physical location(s) may pertain to one or more corresponding virtual locations in the virtual coordinate system. Based the location and/or orientation of the physical positioning relative to the physical location(s), a corresponding location and/or corresponding orientation relative to the virtual location(s) in the virtual coordinate system may be determined in order to determine the corresponding virtual positioning in the virtual coordinate system.

In some embodiments, after determining the virtual positioning of the user 52 in the virtual coordinate system, a signal may be transmitted (e.g., to the mobile device 58) based on the virtual positioning. The signal may cause the mobile device 58 to present features (e.g., images, audio outputs, haptic input) associated with a representative environment associated with the virtual coordinate system. In an example, the signal may cause the mobile device 58 to present features associated with a virtual environment (e.g., the virtual environment 148) represented by the virtual coordinate system. In another example, the signal may cause the mobile device 58 to present features associated with a physical environment (e.g., the representative physical environment 265) represented by the virtual coordinate system. In a further example, the signal may cause the mobile device 58 to present features associated with another object mapped into the virtual coordinate system, such as an avatar or image of another user, an image of an object mapped into the virtual coordinate system by another user, and so forth. Thus, mapping into the virtual coordinate system causes the user 52 to receive additional features from the mobile device 58, and the additional features may augment real-life objects of the physical environment.

At block 666, additional input indicative of an updated physical positioning of the user 52 in the physical environment is received. In some embodiments, the updated physical positioning of the user 52 is determined via the dead reckoning techniques described above. For instance, the movement sensors 105 of the mobile device 58 may transmit sensor data to the computing system 56 to indicate movement of the user 52. The sensor data may be used to determine movement of the user 52 from a previous physical positioning to an updated physical positioning in the physical environment. Thus, the updated physical positioning may be determined or calculated by monitoring movement of the user 52, rather than by directly detecting the particular physical positioning of the user 52 at all times, for example.

In additional embodiments, the movement of the user 52 may be determined via external sensors, such as an image sensor, an optical sensor, a remote sensor, and the like. The external sensors may continuously determine a particular positioning of the user 52 and may transmit sensor data indicative of a current positioning of the user 52. Thus, the updated physical positioning of the user 52 may be directly determined via the sensor data. In certain embodiments, the external sensors may be used in conjunction with the movement sensors 105 of the mobile device 58 to determine the physical positioning of the user 52 more accurately. For instance, a first physical positioning of the user 52, as detected by the external sensors, may be compared with a second physical positioning of the user 52, as determined via the dead reckoning techniques. Based on the comparison between the first physical positioning and the second physical positioning, a final physical positioning of the user 52 may be determined (e.g., via a mathematical average of the first and second physical positionings).

In further embodiments, movement of the user 52 may be determined using another component of the mobile device 58. By way of example, the physical environment may include various features with which the mobile device 58 may interact. Based on the interaction between the mobile device 58 and a particular feature, the updated physical positioning of the user may be determined. For instance, the feature may include a quick response code that the mobile device 58 may scan, an object of which the mobile device 58 may capture an image, a radio-frequency identification reader that may identify the mobile device 58, and the like. The physical location of the feature in the physical environment may be known and associated with a corresponding virtual location in the virtual coordinate system such that a corresponding virtual positioning of the mobile device 58 may be determined based on the interaction with the feature.

Further still, sensor data from movement sensors 105, from external sensors, and/or from other features may be selectively received. In an example, at certain determined physical positionings of the user 52 (e.g., in an ambient environment outside of a structure), sensor data from an external sensor (e.g., GPS) may be received, but at other determined physical positionings of the user 52 (e.g., within a building), sensor data from movement sensors 105 may be received. In another example, received sensor data may be evaluated and sensor data that is determined to be more accurate may be used. For instance, when the user 52 is in the ambient environment, a determination may be made that GPS may accurately determine the physical positioning of the user 52. However, when the user 52 is in the building, a determination may be made that the movement sensors 105 and/or interactions between the mobile device 58 and known features of the building may more accurately determine the physical positioning of the user 52.

At block 668, the virtual positioning of the user 52 in the virtual coordinate system is updated based on the received data. By way of example, the location and/or orientation of the updated physical positioning relative to the previous physical positioning may be determined. Based on the location and/or orientation of the updated physical positioning relative to the previous physical positioning, a corresponding location and/or corresponding orientation relative to the previous virtual positioning in the virtual coordinate system may be determined so as to determine the corresponding updated virtual positioning in the virtual coordinate system. In additional embodiments, each physical positioning of the physical environment is associated with a corresponding virtual positioning in the virtual coordinate system. In this way, the corresponding updated virtual positioning may be directly determined based on the determined updated physical positioning.

At block 670, a signal may be transmitted to the mobile device 58 based on the updated virtual positioning of the user 52 in the virtual coordinate system. The signal may cause the mobile device 58 to update features presented by the mobile device 58. By way of example, the mobile device 58 may update how images are displayed, how audio is output, how haptic input is transmitted, and so forth, to emulate movement of the user 52 in the representative environment. Indeed, signals may be transmitted to the mobile device 58 each time the user 52 moves or otherwise changes physical positioning to immerse the user 52 in the representative environment. In additional embodiments, the signal may be transmitted to the mobile device 58 based on other updates, such as an update to an additional physical positioning of a different user, an additional object mapped into the virtual coordinate system, selection of a different representative environment for which features are presented to the user 52, and so forth. As a result, signals may be sent to the mobile device 58 for updating the presentation of the features in response to any suitable modification associated with the virtual coordinate system.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a physical marker in a physical environment, wherein the physical marker is associated with a virtual location in a virtual coordinate system stored in a database, a physical direction in the physical environment, and a virtual direction in the virtual coordinate system, and the physical marker is configured to receive an initial input from a computing device at an initial orientation between the computing device and the physical marker;
a computing system configured to communicatively couple to the database, the database being configured to store a plurality of features associated with a representative environment associated with the virtual coordinate system, wherein the computing system is configured to:
receive a first input indicative of a physical positioning of a user in the physical environment;
determine a first distance between the physical positioning of the user and the physical marker in the physical environment;
establish a first orientation of the physical positioning of the user relative to the physical direction of the physical marker in the physical environment as the initial orientation between the computing device and the physical marker in response to the physical marker receiving the initial input;
map the physical positioning of the user to a virtual positioning of the user in the virtual coordinate system based on:
a second distance between the virtual positioning of the user and the virtual location of the physical marker in the virtual coordinate system corresponding to the first distance; and
a second orientation of the virtual positioning of the user relative to the virtual direction of the physical marker in the virtual coordinate system corresponding to the first orientation;
receive a second input indicative of an updated physical positioning of the user in the physical environment;
determine an updated virtual positioning of the user in the virtual coordinate system based on the second input; and
output a first signal to the computing device based on the virtual positioning, the updated virtual positioning of the user in the virtual coordinate system, or both.

2. The system of claim 1, wherein the first signal is configured to cause the computing device to present a feature of the plurality of features associated with the representative environment based on the virtual positioning of the user in the virtual coordinate system via an electronic display.

3. The system of claim 2, wherein the computing system is configured to output a second signal to the computing device in response to determining the updated virtual positioning of the user in the virtual coordinate system, and wherein the second signal is configured to cause the computing device to modify a presentation of the feature of the plurality of features associated with the representative environment, present an additional feature of the plurality of features associated with the representative environment, or both.

4. The system of claim 1, wherein the computing system is configured to receive sensor data from the computing device, wherein the sensor data is indicative of movement of the user relative to the physical positioning of the user in the physical environment, wherein the second input comprises the sensor data, and wherein the computing system is configured to determine the updated physical positioning based on the movement of the user relative to the physical positioning of the user as indicated by the sensor data.

5. The system of claim 4, wherein the computing system is configured to:
determine corresponding movement of the user relative to the virtual positioning of the user in the virtual coordinate system based on the movement of the user relative to the physical positioning of the user in the physical environment; and
determine the updated virtual positioning of the user in the virtual coordinate system based on the corresponding movement of the user relative to the virtual positioning of the user.

6. The system of claim 1, wherein the plurality of features comprises an image, an audio output, haptic feedback, or any combination thereof, associated with the representative environment.

7. The system of claim 1, wherein the representative environment is associated with a virtual environment, the physical environment, a mixed environment, an additional physical environment, or any combination thereof.

8. The system of claim 1, wherein the first orientation comprises a first angle between the physical direction of the physical marker and an additional physical direction of the physical positioning of the user, the second orientation comprises a second angle between the virtual direction of the physical marker and an additional virtual direction of the virtual positioning of the user, and the first angle and the second angle correspond to one another.

9. The system of claim 1, wherein the physical marker comprises a sensor configured to receive the initial input from the computing device.

10. A non-transitory computer-readable medium comprising computer-executable instructions that, when executed by a processor, are configured to cause the processor to:
  receive a first input indicative of a first physical positioning of a first user in a first physical environment;
  determine a first distance between the first physical positioning of the first user and a physical marker in the first physical environment, wherein the physical marker is associated with a virtual location in a virtual coordinate system, a physical direction in the first physical environment, and a virtual direction in the virtual coordinate system;
  determine a first orientation of the first physical positioning of the first user relative to the physical direction of the physical marker in the first physical environment, wherein the first orientation comprises a first angle between the physical direction of the physical marker and an additional physical direction of the first physical positioning of the first user;
  map the first physical positioning of the first user to a first virtual positioning of the first user in the virtual coordinate system based on:
    a second distance between the first virtual positioning of the first user and the virtual location of the physical marker in the virtual coordinate system corresponding to the first distance; and
    a second orientation of the first virtual positioning of the first user relative to the virtual direction of the physical marker in the virtual coordinate system corresponding to the first orientation, wherein the second orientation comprises a second angle between the virtual direction of the physical marker and an additional virtual direction of the virtual positioning of the first user, and the first angle and the second angle correspond to one another;
  receive a second input indicative of a second physical positioning of the first user in the first physical environment;
  determine a second virtual positioning of the first user in the virtual coordinate system based on the second input, wherein the second virtual positioning corresponds to the second physical positioning; and
  output a first signal to a first computing device based on the second virtual positioning of the first user in the virtual coordinate system.

11. The non-transitory computer-readable medium of claim 10, wherein the computer-executable instructions, when executed by the processor, are configured to cause the processor to:
  receive a third input indicative of a third physical positioning of a second user in a second physical environment; and
  determine a third virtual positioning of the second user in the virtual coordinate system based on the third input, wherein the third virtual positioning corresponds to the third physical positioning.

12. The non-transitory computer-readable medium of claim 11, wherein the computer-executable instructions, when executed by the processor, are configured to cause the processor to output the first signal configured to cause the first computing device to display a first image of the second user to the first user based on the third virtual positioning of the second user relative to the second virtual positioning of the first user in the virtual coordinate system, output a second signal configured to cause a second computing device to display a second image of the first user to the second user based on the second virtual positioning of the first user relative to the third virtual positioning of the second user in the virtual coordinate system, or both.

13. The non-transitory computer-readable medium of claim 11, wherein the first signal is configured to cause the first computing device to present a first feature associated with a first representative environment associated with the virtual coordinate system via an electronic display, and wherein the computer-executable instructions, when executed by the processor, are configured to cause the processor to output a second signal to a second computing device associated with the second user, wherein the second signal is configured to cause the second computing device to present a second feature associated with a second representative environment associated with the virtual coordinate system via an additional electronic display.

14. The non-transitory computer-readable medium of claim 10, wherein the computer-executable instructions, when executed by the processor, are configured to cause the processor to receive a third input indicative of a third virtual positioning of a feature in the virtual coordinate system, and wherein the first signal is configured to cause the first computing device of the first user to present the feature to the first user based on the second virtual positioning of the first user relative to the third virtual positioning of the feature in the virtual coordinate system.

15. The non-transitory computer-readable medium of claim 14, wherein the computer-executable instructions, when executed by the processor, are configured to cause the processor to:
  receive a fourth input indicative of movement of the feature from the third virtual positioning to a fourth virtual positioning in the virtual coordinate system; and
  transmit a third signal configured to cause the first computing device of the first user to modify a presentation of the feature based on the fourth virtual positioning of the feature in the virtual coordinate system.

16. The non-transitory computer-readable medium of claim 15, wherein the fourth input is received from a second computing device of a second user.

17. The non-transitory computer-readable medium of claim 10, wherein the computer-executable instructions, when executed by the processor, are configured to cause the processor to:
  determine a representative positioning of the first user in a representative environment based on the second virtual positioning of the first user in the virtual coordinate system, wherein the representative environment is associated with the virtual coordinate system; and output a second signal to instruct a mobile device of a second user to present an image of the first user in the representative environment based on the representative positioning of the first user in the representative environment.

18. A method comprising:

receiving, via a processor, a first input indicative of a physical positioning of a user in a physical environment;

determining, via the processor, receipt of a second input at a device in the physical environment, wherein the device is associated with a virtual location in a virtual coordinate system, a physical direction in the physical environment, and a virtual direction in the virtual coordinate system, and the device is configured to receive the second input from a computing device at an initial orientation between the device and the computing device;

determining, via the processor, a first distance between the physical positioning of the user and the device in the physical environment;

setting, via the processor, a first orientation of the physical positioning of the user relative to the physical direction of the device in the physical environment as the initial orientation in response to the device receiving the second input;

mapping, via the processor, the physical positioning of the user to a virtual positioning of the user in the virtual coordinate system based on:

a second distance between the virtual positioning of the user and the virtual location of the device in the virtual coordinate system corresponding to the first distance; and a second orientation of the virtual positioning of the user relative to the virtual direction of the device in the virtual coordinate system corresponding to the first orientation;

determining, via the processor, a representative positioning of the user in a representative environment based on the virtual positioning of the user in the virtual coordinate system, wherein the representative environment is associated with the virtual coordinate system; and outputting, via the processor, a signal configured to cause a computing device to present a feature associated with the representative environment via an electronic display based on the virtual positioning of the user in the virtual coordinate system.

19. The method of claim 18, comprising:

receiving, via the processor, an additional input indicative of an additional physical positioning of the user in the physical environment;

determining, via the processor, a first relationship between the additional physical positioning and the physical positioning; and determining, via the processor, an additional virtual positioning of the user relative to the virtual positioning of the user in the virtual coordinate system based on a second relationship between the virtual positioning and the additional virtual positioning corresponding to the first relationship between the additional physical positioning and the physical positioning.

20. The method of claim 18, wherein the device comprises a scanner.

* * * * *